US012486422B2

(12) United States Patent
Ikoshi et al.

(10) Patent No.: US 12,486,422 B2
(45) Date of Patent: Dec. 2, 2025

(54) TEXTILE PRINTING INK SET AND TEXTILE PRINTING METHOD

(71) Applicant: FUJIFILM CORPORATION, Tokyo (JP)

(72) Inventors: Masao Ikoshi, Kanagawa (JP); Ryoichi Nakano, Kanagawa (JP); Shota Suzuki, Kanagawa (JP); Shinichiro Sekine, Kanagawa (JP); Shohei Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 876 days.

(21) Appl. No.: 17/676,814

(22) Filed: Feb. 22, 2022

(65) Prior Publication Data
US 2022/0177721 A1 Jun. 9, 2022

Related U.S. Application Data

(63) Continuation of application No. PCT/JP2020/036090, filed on Sep. 24, 2020.

(30) Foreign Application Priority Data

Sep. 30, 2019 (JP) ................. 2019-180627

(51) Int. Cl.
C09D 11/54 (2014.01)
B41J 3/407 (2006.01)
B41M 5/00 (2006.01)
C09D 11/033 (2014.01)
C09D 11/037 (2014.01)
C09D 11/102 (2014.01)
C09D 11/328 (2014.01)
C09D 11/38 (2014.01)
C09D 11/40 (2014.01)
D06P 1/16 (2006.01)
D06P 1/22 (2006.01)
D06P 1/642 (2006.01)
D06P 1/655 (2006.01)
D06P 5/00 (2006.01)
D06P 5/30 (2006.01)

(52) U.S. Cl.
CPC ............. C09D 11/54 (2013.01); B41J 3/4078 (2013.01); B41M 5/0017 (2013.01); B41M 5/0023 (2013.01); C09D 11/033 (2013.01); C09D 11/037 (2013.01); C09D 11/102 (2013.01); C09D 11/328 (2013.01); C09D 11/38 (2013.01); C09D 11/40 (2013.01); D06P 1/16 (2013.01); D06P 1/22 (2013.01); D06P 1/642 (2013.01); D06P 1/6429 (2013.01); D06P 1/655 (2013.01); D06P 5/002 (2013.01); D06P 5/30 (2013.01)

(58) Field of Classification Search
CPC ...... C09D 11/54; B41M 5/0017; D06P 5/002; D06P 1/655; D06P 1/6429
See application file for complete search history.

(56) References Cited

U.S. PATENT DOCUMENTS

| 6,080,229 A | 6/2000 | Watanabe et al. | |
| 2005/0174411 A1 | 8/2005 | Adachi et al. | |
| 2010/0015360 A1* | 1/2010 | Kyota | C09D 11/328 427/595 |
| 2019/0031898 A1* | 1/2019 | Tange | C09D 11/328 |
| 2019/0100871 A1 | 4/2019 | Taga et al. | |
| 2020/0115576 A1 | 4/2020 | Kodama et al. | |
| 2022/0213343 A1 | 7/2022 | Suzuki et al. | |

FOREIGN PATENT DOCUMENTS

| JP | H10-052908 A | 2/1998 | |
| JP | H10-114140 A | 5/1998 | |
| JP | H11-315233 A | 11/1999 | |
| JP | 2004-042593 A | 2/2004 | |
| JP | 2016-141686 A | 8/2016 | |
| JP | 2017-206789 A | 11/2017 | |
| JP | 2018-114751 A | 7/2018 | |
| JP | 2019-011449 A | 1/2019 | |
| JP | 2019-038893 A | 3/2019 | |
| JP | 2019-064160 A | 4/2019 | |
| JP | 7443386 B2 * | 3/2024 | ............. C09D 11/38 |
| WO | WO-2018043414 A1 * | 3/2018 | ............. B41M 5/00 |
| WO | 2019/004327 A1 | 1/2019 | |
| WO | 2021065249 A1 | 4/2021 | |

OTHER PUBLICATIONS

International Search Report issued in International Application No. PCT/JP2020/036090 on Dec. 1, 2020.
Written Opinion of the ISA issued in International Application No. PCT/JP2020/036090 on Dec. 1, 2020.
English language translation of the following: Office action dated Sep. 5, 2023 from the JPO in a Japanese patent application No. 2021-551163 corresponding to the instant patent application.
English language translation of the following: Office action dated Apr. 4, 2023 from the JPO in a Japanese patent application No. 2021-551163 corresponding to the instant patent application. This office action translation is submitted now in order to supplement the understanding of the cited references which are being disclosed in the instant Information Disclosure Statement.

* cited by examiner

Primary Examiner — Sophie Hon
(74) Attorney, Agent, or Firm — SOLARIS Intellectual Property Group, PLLC

(57) ABSTRACT

Provided are a textile printing ink set including a pretreatment liquid including a quaternary ammonium cation having a molecular weight of 3000 or less, and an ink composition including a water-insoluble dye, a dispersing agent, and water, wherein a content of the quaternary ammonium cation relative to a total amount of the pretreatment liquid is 5 mass % to 20 mass %; and a textile printing method.

7 Claims, No Drawings

TEXTILE PRINTING INK SET AND TEXTILE PRINTING METHOD

CROSS-REFERENCE TO RELATED APPLICATIONS

This application is a Continuation of International Application No. PCT/JP2020/036090, filed Sep. 24, 2020, which claims priority to Japanese Patent Application No. 2019-180627, filed Sep. 30, 2019. Each of the above applications is hereby expressly incorporated by reference, in its entirety, into the present application.

BACKGROUND OF THE INVENTION

1. Field of the Invention

The present disclosure relates to a textile printing ink set and a textile printing method.

2. Description of the Related Art

In these years, various studies on textile printing methods for textiles have been performed.

For example, JP2016-141686A, JP2019-011449A, and JP2017-206789A disclose a method in which, in order to obtain a sharp image, before an ink is applied to a textile, a pretreatment agent is applied to the textile in advance. JP2019-064160A discloses a treatment agent including a cationic substance and a non-cationic thickening agent, wherein the cationic substance is at least one selected from the group consisting of a cationic polymer that is dried to form a flexible film, a cationic surfactant, a polyvalent metallic salt, and a polyvalent metal ion.

SUMMARY OF THE INVENTION

However, in some cases, printed textiles obtained by printing on textiles are desirably less likely to cause color staining of other textiles and have further improved texture.

Under such circumstances, the present disclosure has been made; embodiments of the present disclosure provide a textile printing ink set and a textile printing method that can provide a printed textile that is less likely to cause color staining of other textiles and has good texture.

The present disclosure includes the following embodiments.

<1> A textile printing ink set including a pretreatment liquid including a quaternary ammonium cation having a molecular weight of 3000 or less, and an ink composition including a water-insoluble dye, a dispersing agent, and water, wherein a content of the quaternary ammonium cation relative to a total amount of the pretreatment liquid is 5 mass % to 20 mass %.

<2> The textile printing ink set according to <1>, wherein the quaternary ammonium cation has a total number of carbon atoms of 10 or more.

<3> The textile printing ink set according to <1> or <2>, wherein the quaternary ammonium cation has an aromatic ring.

<4> The textile printing ink set according to any one of <1> to <3>, wherein the quaternary ammonium cation has a benzyl group.

<5> The textile printing ink set according to any one of <1> to <4>, wherein the dispersing agent is a urethane resin.

<6> The textile printing ink set according to any one of <1> to <5>, wherein the water-insoluble dye is at least one dye selected from the group consisting of an oil-soluble dye, a disperse dye, and a vat dye.

<7> The textile printing ink set according to any one of <1> to <6>, wherein the water-insoluble dye is C.I. Solvent Black 3.

<8> A textile printing method including a pretreatment liquid application step of applying the pretreatment liquid included in the textile printing ink set according to any one of <1> to <7>, to a textile, and an ink application step of applying the ink composition included in the textile printing ink set according to any one of <1> to <7>, to the textile to which the pretreatment liquid has been applied.

<9> The textile printing method according to <8>, wherein, in the pretreatment liquid application step, the pretreatment liquid is applied by an ink jet recording process.

<10> The textile printing method according to <8> or <9>, wherein, in the ink application step, the ink composition is applied by an ink jet recording process.

Embodiments of the present disclosure can provide a textile printing ink set and a textile printing method that can provide a printed textile that is less likely to cause color staining of other textiles and has good texture.

DESCRIPTION OF THE PREFERRED EMBODIMENTS

Hereinafter, the textile printing ink set and the textile printing method according to the present disclosure will be described in detail.

In this Specification, numerical ranges described as "a value 'to' another value" mean ranges including the value and the other value respectively as the minimum value and the maximum value.

In this Specification, among numerical ranges described in series, the upper limit value or the lower limit value of a numerical range may be replaced by the upper limit value or the lower limit value of one of other numerical ranges described in series. In this Specification, among numerical ranges, the upper limit value or the lower limit value of a numerical range may be replaced by a value described in Examples.

In this Specification, the amount of each of components in a composition means, when the composition contains a plurality of substances belonging to such a component, the total amount of the plurality of substances in the composition unless otherwise specified.

In this Specification, combinations of two or more preferred embodiments are more preferred embodiments.

In this Specification, the term "step" includes not only an independent step, but also a step that is not clearly distinguished from another step but that achieves the intended result of the step.

Textile Printing Ink Set

The textile printing ink set according to the present disclosure (hereafter, simply referred to as "ink set") has a pretreatment liquid including a quaternary ammonium cation having a molecular weight of 3000 or less, and an ink composition including a water-insoluble dye, a dispersing agent, and water, wherein the content of the quaternary ammonium cation relative to the total amount of the pretreatment liquid is 5 mass % to 20 mass %. The ink set according to the present disclosure is used for textile printing, in other words, used for printing on textiles.

The pretreatment liquid in the ink set according to an embodiment of the present disclosure is applied to a textile and subsequently, to the textile to which the pretreatment liquid has been applied, the ink composition in the ink set according to an embodiment of the present disclosure is applied, to thereby provide a printed textile that is less likely to cause color staining of other textiles and has good texture.

In the related art, when an ink containing a dye and a dispersing agent is used to perform textile printing, washing results in a phenomenon of color staining of other textiles, in particular, nylon in some cases. As a technique of suppressing color staining, there is a known technique of applying a pretreatment liquid including a large amount of a cationic polymer to a textile in advance. However, the application of the pretreatment liquid including a large amount of a cationic polymer to a textile results in a phenomenon of providing a printed textile having poor texture in some cases. Therefore, it has been difficult to obtain a printed textile that is less likely to cause color staining of other textiles and has good texture.

When the pretreatment liquid includes a cationic polymer, the cationic polymer and the dispersing agent included in the ink composition form a cross-linked structure on the textile, which inferentially results in poor texture. By contrast, the pretreatment liquid in the ink set according to an embodiment of the present disclosure includes a quaternary ammonium cation having a molecular weight of 3000 or less, and does not form the cross-linked structure with the dispersing agent included in the ink composition in the ink set according to an embodiment of the present disclosure, which inferentially results in a printed textile that is less likely to cause color staining of other textiles and has good texture.

The pretreatment liquid in the ink set according to an embodiment of the present disclosure includes a quaternary ammonium cation having a molecular weight of 3000 or less, and the quaternary ammonium cation reacts with, on a textile, the dispersing agent included in the ink composition in the ink set according to an embodiment of the present disclosure. The quaternary ammonium cation turns the dispersing agent to be insoluble in water, and the water-insoluble dye aggregates on the textile and is fixed. The water-insoluble dye exhibits high fixability on the textile, which inferentially becomes less likely to cause color staining of other textiles. In addition, the content of the quaternary ammonium cation having a molecular weight of 3000 or less relative to the total amount of the pretreatment liquid is 5 mass % to 20 mass %, which inferentially provides a printed textile that is less likely to cause color staining of other textiles and has good texture.

Hereinafter, components included in the ink set according to the present disclosure will be described.

Pretreatment Liquid

In the present disclosure, the pretreatment liquid includes a quaternary ammonium cation having a molecular weight of 3000 or less.

Quaternary Ammonium Cation

The quaternary ammonium cation has a molecular weight of 3000 or less, preferably 2000 or less, more preferably 1500 or less. When the molecular weight is 3000 or less, a printed textile having good texture can be provided. The lower limit value of the molecular weight is not particularly limited, but is, from the viewpoint of odor, preferably 100.

The molecular weight can be determined by using nuclear magnetic resonance (NMR) method to analyze the structure of the quaternary ammonium cation included in the pretreatment liquid, and using the atomic weights of atoms constituting the quaternary ammonium cation to calculate the molecular weight.

The quaternary ammonium cation is an ion having four substituents for a nitrogen atom. The quaternary ammonium cation is represented by, for example, the following Formula (A).

(A)

In Formula (A), $R^1$ to $R^4$ may be the same or different from each other. Preferably, $R^1$ to $R^4$ each independently represent a hydrocarbon group that may include at least one selected from the group consisting of an aromatic ring, an ether bond, and an ester bond. The hydrocarbon group may be substituted with at least one substituent selected from the group consisting of a hydroxy group, an amino group, and a halogen atom.

At least two of $R^1$ to $R^4$ are each independently preferably a hydrocarbon group that does not include at least one selected from the group consisting of an aromatic ring, an ether bond, and an ester bond, more preferably an alkyl group, still more preferably an alkyl group having 1 to 8 carbon atoms, particularly preferably an alkyl group having 1 to 4 carbon atoms. Such an alkyl group may be linear or branched, but is preferably linear.

From the viewpoint of making the resultant printed textile be even less likely to cause color staining of other textiles, at least one of $R^1$ to $R^4$ is preferably a hydrocarbon group including at least one selected from the group consisting of an aromatic ring, an ether bond, and an ester bond.

Examples of the aromatic ring that can be included in the hydrocarbon group include a benzene ring, a naphthalene ring, and an anthracene ring. The aromatic ring is preferably a benzene ring. The form of the aromatic ring in the hydrocarbon group may be the form of a monovalent aromatic group (namely, an aryl group), the form of a divalent aromatic group (namely, an arylene group), or the form of a tri- or higher valent aromatic group. Examples of the hydrocarbon group including an aromatic ring include a phenyl group, a benzyl group, a phenoxy group, a benzyloxy group, a phenylcarbonyl group, a phenoxyalkyl group having 7 to 12 carbon atoms, a benzyloxyalkyl group having 7 to 12 carbon atoms, a phenylcarbonylalkyl group having 8 to 12 carbon atoms, and a diphenylmethyloxyalkyl group having 14 to 20 carbon atoms. The hydrocarbon group including an aromatic ring is preferably a phenyl group or a benzyl group, more preferably a benzyl group.

Examples of the hydrocarbon group including an ether bond include alkoxy groups, alkoxyalkyl groups, and polyoxyalkylene groups. The hydrocarbon group including an ether bond is preferably a polyoxyethylene group or a polyoxypropylene group, more preferably a polyoxyethylene group or a polyoxypropylene group having 10 to 100 carbon atoms, still more preferably a polyoxyethylene group or a polyoxypropylene group having 20 to 50 carbon atoms, particularly preferably a polyoxypropylene group having 20 to 50 carbon atoms.

Examples of the hydrocarbon group including an ester bond include alkylcarbonyloxy groups and acryloyloxy groups. The hydrocarbon group including an ester bond is preferably an acryloyloxy group.

In Formula (A), preferably, $R^1$ to $R^3$ are each independently a hydrocarbon group not including at least one selected from the group consisting of an aromatic ring, an ether bond, and an ester bond, and $R^4$ is a hydrocarbon group including at least one selected from the group consisting of an aromatic ring, an ether bond, and an ester bond. More preferably, $R^1$ and $R^2$ are alkyl groups having 1 to 8 carbon atoms, $R^3$ is an alkyl group having 4 to 20 carbon atoms, and $R^4$ is a hydrocarbon group including at least one selected from the group consisting of an aromatic ring, an ether bond, and an ester bond. Still more preferably, $R^1$ and $R^2$ are alkyl groups having 1 to 4 carbon atoms, $R^3$ is an alkyl group having 8 to 15 carbon atoms, and $R^4$ is a hydrocarbon group including at least one selected from the group consisting of an aromatic ring, an ether bond, and an ester bond. The preferred examples of the "hydrocarbon group including at least one selected from the group consisting of an aromatic ring, an ether bond, and an ester bond" are the same as those described above.

From the viewpoint of making the resultant printed textile be even less likely to cause color staining of other textiles, the quaternary ammonium cation preferably has an aromatic ring, more preferably specifically has a phenyl group or a benzyl group, still more preferably has a benzyl group.

Examples of the quaternary ammonium cation having a benzyl group include a benzyldimethyltetradecylammonium cation, a benzylhexadecyldimethylammonium cation, a benzyldimethylstearylammonium cation, and a benzyldodecyldimethylammonium cation.

From the viewpoint of making the resultant printed textile be even less likely to cause color staining of other textiles, the quaternary ammonium cation preferably has a total number of carbon atoms of 10 or more, more preferably 17 or more, still more preferably 19 or more.

The total number of carbon atoms is, from the viewpoint of making the molecular weight be 3000 or less, preferably 200 or less, more preferably 150 or less.

The quaternary ammonium cation is preferably contained, as a quaternary ammonium salt, in the pretreatment liquid. Examples of the counter anion in the quaternary ammonium salt include halide ions such as Cl$^-$, Br$^-$, and I$^-$; organic sulfonate anions having a substituent selected from the group consisting of an alkyl group, an alkenyl group, an alkynyl group, a cycloalkyl group, an alkoxy group, an aryl group, an aralkyl group, and a heterocyclic group; PF$_6^-$ and BF$_4^-$. The counter anion is, from the viewpoint of solubility in the pretreatment liquid, preferably Cl$^-$, Br$^-$, or a sulfonate anion having an alkyl group, more preferably Cl$^-$ or Br$^-$, still more preferably Cl$^-$.

In the present disclosure, the content of the quaternary ammonium cation relative to the total amount of the pretreatment liquid is 5 mass % to 20 mass %, preferably 8 mass % to 18 mass %. When the content of the quaternary ammonium cation is 5 mass % or more, a printed textile that is less likely to cause color staining of other textiles is provided. On the other hand, when the content of the quaternary ammonium cation is 20 mass % or less, a printed textile having good texture is provided.

In the pretreatment liquid, the content of the quaternary ammonium cation can be calculated, for example, in the following manner.

First, in the case where the pretreatment liquid includes, as described below, water and an aqueous organic solvent, these are removed by heat treatment, for example. Subsequently, from the solid content included in the pretreatment liquid, the quaternary ammonium salt is extracted by GPC. The NMR method is used to analyze the structure of the quaternary ammonium salt, to identify the quaternary ammonium cation constituting the quaternary ammonium salt. On the basis of the amount of the extracted quaternary ammonium salt, the amount of the quaternary ammonium cation is calculated. On the basis of the amount of the pretreatment liquid and the amount of the quaternary ammonium salt, the content of the quaternary ammonium cation in the pretreatment liquid is calculated.

Water

The pretreatment liquid preferably includes water. In the pretreatment liquid, the water content relative to the total amount of the pretreatment liquid is preferably 40 mass % or more, more preferably 50 mass % or more, still more preferably 60 mass % or more, particularly preferably 80 mass % or more. The water content relative to the total amount of the pretreatment liquid is preferably 98 mass % or less, more preferably 95 mass % or less.

Aqueous Organic Solvent

The pretreatment liquid may include at least one aqueous organic solvent.

In the aqueous organic solvent, "aqueous" means that the amount of the solvent soluble in 100 g of distilled water at 25° C. is more than 1 g. This amount of the aqueous organic solvent soluble is preferably 5 g or more, more preferably 10 g or more, still more preferably 20 g or more.

Examples of the aqueous organic solvent include alcohol-based solvents, amide-based solvents, nitrile-based solvents, polyalkylene glycol-based solvents, and polyalkylene glycol alkyl ether-based solvents; preferred are alcohol-based solvents and amide-based solvents.

Examples of the aqueous organic solvent include methanol, ethanol, n-propanol, isopropanol, n-butanol, isobutanol, tert-butanol, trimethylolpropane, ethylene glycol, diethylene glycol, triethylene glycol, tetraethylene glycol, propylene glycol, butylene glycol, 1,2,6-hexanetriol, hexylene glycol, glycerol, diglycerol, 2-pyrrolidone, N-methyl-2-pyrrolidone, 1,5-pentanediol, 1,6-hexanediol, 2-methyl-1,3-propanediol, ethylene glycol monoethyl ether, ethylene glycol monobutyl ether, acetonitrile, polyethylene glycol (for example, molecular weight: 400 to 800), hydroxyethylpyrrolidone, hydroxypropylpyrrolidone, valerolactam, caprolactam, heptalactam, polyethylene glycol monomethyl ether (molecular weight: 400), polyethylene glycol monomethyl ether (molecular weight: 550), polyethylene glycol dimethyl ether (molecular weight: 500), tripropylene glycol, tetrapropylene glycol, polypropylene glycol (molecular weight: 400), polypropylene glycol (molecular weight: 600), and polypropylene glycol (molecular weight: 700).

The aqueous organic solvent preferably includes at least one selected from the group consisting of trimethylolpropane, ethylene glycol, diethylene glycol, triethylene glycol, tetraethylene glycol, propylene glycol, glycerol, 2-pyrrolidone, 1,5-pentanediol, 1,6-hexanediol, 2-methyl-1,3-propanediol, and ethylene glycol monobutyl ether, more preferably includes at least one selected from the group consisting of ethylene glycol, diethylene glycol, triethylene glycol, tetraethylene glycol, propylene glycol, glycerol, 2-pyrrolidone, 2-methyl-1,3-propanediol, and ethylene glycol monobutyl ether, still more preferably includes at least one selected from the group consisting of ethylene glycol, glycerol, 2-pyrrolidone, 2-methyl-1,3-propanediol, and tetraethylene glycol.

When the pretreatment liquid contains an aqueous organic solvent, the content of the aqueous organic solvent in the pretreatment liquid relative to the total amount of the pretreatment liquid is preferably 1 mass % to 50 mass %, more preferably 5 mass % to 40 mass %, still more preferably 10 mass % to 30 mass %.

Surfactant

The pretreatment liquid may include at least one surfactant.

The surfactant is not particularly limited, and publicly known surfactants such as silicone-based surfactants, fluorosurfactants, and acetylene glycol-based surfactants are usable.

When the pretreatment liquid according to the present disclosure contains a surfactant, the surfactant content relative to the total amount of the pretreatment liquid is preferably 0.05 mass % to 2.0 mass %, more preferably 0.1 mass % to 2.0 mass %.

Other Aggregation Agent

The quaternary ammonium cation functions as an aggregation agent that aggregates the water-insoluble dye in the ink composition. The pretreatment liquid may include, in addition to the quaternary ammonium cation, at least one other aggregation agent. Examples of the other aggregation agent include polyvalent metallic salts and cationic compounds.

Polyvalent Metallic Salts

The polyvalent metallic salts are compounds constituted by a di- or higher valent metallic ion and an anion. Specific examples of the polyvalent metallic salts include calcium chloride, calcium nitrate, calcium sulfate, calcium acetate, calcium hydroxide, calcium carbonate, magnesium chloride, magnesium acetate, magnesium sulfate, magnesium carbonate, barium sulfate, barium chloride, zinc sulfide, zinc carbonate, and copper nitrate.

Cationic Compounds

The cationic compounds are not particularly limited and may be low-molecular-weight compounds or high-molecular-weight compounds. The cationic compounds do not include quaternary ammonium salts composed of the quaternary ammonium cation and a counter ion.

Other Component

The pretreatment liquid may include, in addition to the above-described components, another component. Examples of the other component include a pH adjusting agent, a fluorescent brightening agent, a surface tension modifier, an anti-foaming agent, an anti-drying agent, a lubricant, a thickener, an ultraviolet absorbent, an antifading agent, an antistatic agent, a matting agent, an antioxidant, a resistivity control agent, an anticorrosive, a reduction inhibitor, a preservative, a fungicide, and a chelating agent.

Ink Composition

In the present disclosure, the ink composition includes a water-insoluble dye, a dispersing agent, and water. The ink composition may include, as needed, another component.

Water-Insoluble Dye

The ink composition includes a water-insoluble dye. The ink composition may include a single water-insoluble dye, or two or more water-insoluble dyes.

In the water-insoluble dye, "water-insoluble" means a property of having a solubility in water at 20° C. of 1 mass % or less. Thus, in the present disclosure, the water-insoluble dye means a dye having a solubility in water at 20° C. of 1 mass % or less.

The water-insoluble dye is preferably at least one dye selected from the group consisting of an oil-soluble dye, a disperse dye, and a vat dye. Examples of the oil-soluble dye, the disperse dye, and the vat dye will be described below. Note that "C.I." is the abbreviation of "Colour Index". The dyes described with "Disperse" are disperse dyes. The dyes described with "Solvent" are oil-soluble dyes. The dyes described with "Vat" are vat dyes.

Examples of the oil-soluble dyes include

C.I. Solvent Yellow 2, 14, 16, 21, 33, 43, 44, 56, 82, 85, 93, 98, 114, 131, 135, 157, 160, 163, 167, 176, 179, 185, 189;

C.I. Solvent Red 8, 23 24, 25, 49, 52, 109, 111, 119, 122, 124, 135, 146, 149, 150, 168, 169, 172, 179, 195, 196, 197, 207, 222, 227, 312, 313;

C.I. Solvent Blue 3, 4, 5, 35, 36, 38, 44, 45, 59, 63, 67, 68, 70, 78, 83, 97, 101, 102, 104, 105, 111, 122;

C.I. Solvent Orange 3, 14, 54, 60, 62, 63, 67, 86, 107;

C.I. Solvent Violet 8, 9, 11, 13, 14, 26, 28, 31, 36, 59;

C.I. Solvent Green 3, 5, 7, 28;

C.I. Solvent Brown 53; and

C.I. Solvent Black 3, 5, 7, 27, 28, 29, 34.

Examples of the disperse dyes include

C.I. Disperse Yellow 3, 7, 8, 23, 39, 51, 54, 60, 71, 86;

C.I. Disperse Red 11, 50, 53, 55, 55:1, 59, 60, 65, 70, 75, 93, 146, 158, 190, 190:1, 207, 239, 240;

C.I. Disperse Blue 3, 5, 19, 26, 26:1, 35, 55, 56, 58, 64, 64:1, 72, 72:1, 81, 81:1, 91, 95, 108, 131, 141, 145, 359, 360;

C.I. Disperse Orange 1, 1:1, 5, 7, 20, 23, 25, 25:1, 33, 56, 76;

C.I. Disperse Violet 8, 11, 17, 23, 26, 27, 28, 29, 36, 57; and

C.I. Disperse Brown 2.

Examples of the vat dyes include

C.I. Vat Yellow 2, 4, 10, 20, 33;

C.I. Vat Orange 1, 2, 3, 5, 7, 9, 13, 15;

C.I. Vat Red 1, 2, 10, 13, 15, 16, 41, 61;

C.I. Vat Blue 1, 3, 4, 5, 6, 8, 12, 14, 18, 19, 20, 29, 35, 41; and

C.I. Vat Black 1, 8, 9, 13, 14, 20, 25, 27, 29, 36, 56, 57, 59, 60.

The water-insoluble dye may be an oil-soluble dye obtained by making a reactive dye or an acid dye be oil-soluble.

The oil-soluble dye obtained by making a reactive dye be oil-soluble is, for example, an oil-soluble dye obtained by modifying a reactive dye with an alkyl group having 4 or more carbon atoms. The reactive dye employed for being made to be oil-soluble is, for example, C.I. Reactive Black 5.

The oil-soluble dye obtained by making an acid dye be oil-soluble is, for example, an oil-soluble dye obtained by subjecting the cation in the acid dye to exchange of counter cations using a cation having 8 or more carbon atoms. The acid dye employed for being made to be oil-soluble is, for example, C.I. Acid Black 1.

One of preferred forms of the oil-soluble dye may be an oil-soluble dye represented by Formula (D1) below.

The oil-soluble dye represented by Formula (D1) includes the dye skeleton in a water-soluble reactive dye C.I. Reactive Black 5 and includes the dye skeleton in an acid dye C.I. Acid Black 1. The oil-soluble dye represented by Formula (D1) can be obtained by making C.I. Reactive Black 5 or C.I. Acid Black 1 be oil-soluble.

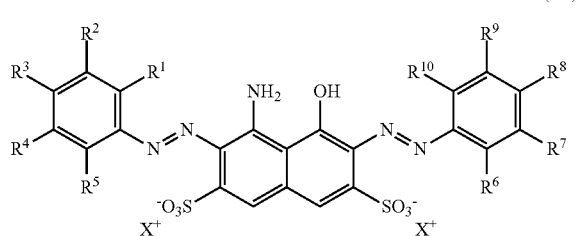

(D1)

In Formula (D1), $R^1$ to $R^{10}$ each independently represent a hydrocarbon group that has 1 to 60 carbon atoms and that may include an oxygen atom, a nitrogen atom, a sulfur atom, or a chlorine atom, a hydrogen atom, a chlorine atom, a nitro group, an amino group, a sulfo group, or a salt of a sulfo group, and two $X^+$'s represent an inorganic cation or an organic cation.

Note that at least one of the following is satisfied: at least one of $R^1$ to $R^{10}$ is a group including an alkyl group having 4 or more carbon atoms, or at least one of two $X^+$'s is an organic cation including an alkyl group having 4 or more carbon atoms.

In Formula (D1), in each of $R^1$ to $R^{10}$, the hydrocarbon group that has 1 to 60 carbon atoms and that may include an oxygen atom, a nitrogen atom, a sulfur atom, or a chlorine atom means an organic group that includes a carbon atom and a hydrogen atom, that may include an oxygen atom, a nitrogen atom, a sulfur atom, or a chlorine atom, and has 1 to 60 carbon atoms in total.

In each of $R^1$ to $R^{10}$, the hydrocarbon group that may include an oxygen atom, a nitrogen atom, a sulfur atom, or a chlorine atom may be a hydrocarbon group not including an oxygen atom, a nitrogen atom, a sulfur atom, or a chlorine atom.

The hydrocarbon group not including an oxygen atom, a nitrogen atom, a sulfur atom, or a chlorine atom may be an alkyl group, an alkenyl group, an alkynyl group, an aryl group, an aralkyl group, or an alkylaryl group.

The concept of the hydrocarbon group including an oxygen atom encompasses, for example, hydroxyalkyl groups, alkoxy groups, alkoxyalkyl groups, alkylcarbonyl groups, and alkylcarbonyloxy groups.

The concept of the hydrocarbon group including a nitrogen atom encompasses, for example, alkylamino groups (specifically, monoalkylamino groups or dialkylamino groups), and alkylaminoalkyl groups.

The concept of the hydrocarbon group including a sulfur atom encompasses, for example, thiolalkyl groups and alkylthio groups.

The concept of the hydrocarbon group including an oxygen atom and a sulfur atom encompasses, for example, alkylsulfonyl groups, arylsulfonyl groups, alkoxyalkylthio groups, alkylthioalkylsulfonyl groups, and alkoxyalkylsulfonyl groups.

The concept of the hydrocarbon group including an oxygen atom, a nitrogen atom, and a sulfur atom encompasses, for example, alkoxyalkylaminoalkylsulfonyl groups and alkylaminoalkylsulfonyl groups.

The concept of the hydrocarbon group including a chlorine atom encompasses, for example, groups provided by replacing hydrogen atoms in the above-described specific examples by chlorine atoms.

In each of $R^1$ to $R^{10}$, the hydrocarbon group that has 1 to 60 carbon atoms and that may include an oxygen atom, a nitrogen atom, a sulfur atom, or a chlorine atom preferably has 1 to 50 carbon atoms.

In each of $R^1$ to $R^{10}$, the hydrocarbon group that has 1 to 60 carbon atoms and that may include an oxygen atom, a nitrogen atom, a sulfur atom, or a chlorine atom is preferably a hydrocarbon group that has 1 to 60 (more preferably 1 to 50) carbon atoms and that may include an oxygen atom, a nitrogen atom, or a sulfur atom.

In each of $R^1$ to $R^{10}$, the hydrocarbon group that has 1 to 60 carbon atoms and that may include an oxygen atom, a nitrogen atom, a sulfur atom, or a chlorine atom preferably includes a sulfonyl group.

In each of $R^1$ to $R^{10}$, the hydrocarbon group that has 1 to 60 carbon atoms and that may include an oxygen atom, a nitrogen atom, a sulfur atom, or a chlorine atom is particularly preferably an alkylthioalkylsulfonyl group, an alkoxyalkylsulfonyl group, an alkoxyalkylaminoalkylsulfonyl group (specifically, a mono(alkoxyalkyl)aminoalkylsulfonyl group or a di(alkoxyalkyl)aminoalkylsulfonyl group), or an alkylaminoalkylsulfonyl group (specifically, a monoalkylaminoalkylsulfonyl group or a dialkylaminoalkylsulfonyl group).

$R^1$ to $R^{10}$ may each be independently a hydrogen atom, a chlorine atom, a nitro group, an amino group, a sulfo group, or a salt of a sulfo group.

The salt of a sulfo group is preferably an alkali metal salt.

Two $X^+$'s represent an inorganic cation or an organic cation.

The inorganic cation is preferably an alkali metal ion, more preferably $K^+$ or $Na^+$.

The organic cation is preferably an organic ammonium ion.

Formula (D1) satisfies at least one of the following: at least one (more preferably at least two) of $R^1$ to $R^{10}$ is a group including an alkyl group having 4 or more carbon atoms, or at least one (more preferably two) of two $X^+$'s is an organic cation including an alkyl group having 4 or more carbon atoms.

In Formula (D1), for the "group including an alkyl group having 4 or more carbon atoms", the group as a whole preferably has 4 to 60, more preferably 4 to 50, still more preferably 4 to 30, particularly preferably 4 to 25 carbon atoms.

The group including an alkyl group having 4 or more carbon atoms may be a primary amino group including an alkyl group having 4 or more carbon atoms, a secondary amino group including an alkyl group having 4 or more carbon atoms, an alkoxy group that may be substituted, or a thioalkyl group that may be substituted. In particular, the group including an alkyl group having 4 or more carbon atoms is preferably a primary amino group including an alkyl group having 4 or more carbon atoms, or a secondary amino group including an alkyl group having 4 or more carbon atoms.

In Formula (D1), the "organic cation including an alkyl group having 4 or more carbon atoms" preferably has 4 to 60, more preferably 4 to 50, still more preferably 4 to 30, particularly preferably 4 to 25 carbon atoms.

The organic cation including an alkyl group having 4 or more carbon atoms is preferably an organic ammonium ion including an alkyl group having 4 or more carbon atoms.

From the viewpoint of providing a printed textile that is less likely to cause color staining of other textiles and has further improved texture, Formula (D1) preferably has a form in which at least one of $R^1$ to $R^{10}$ is a group including an alkyl group having 4 or more carbon atoms, and two $X^+$'s are each independently $K^+$ or $Na^+$.

From the viewpoint of providing a printed textile that is less likely to cause color staining of other textiles and has further improved texture, the oil-soluble dye (D1) is preferably an oil-soluble dye (D2) represented by the following Formula (D2).

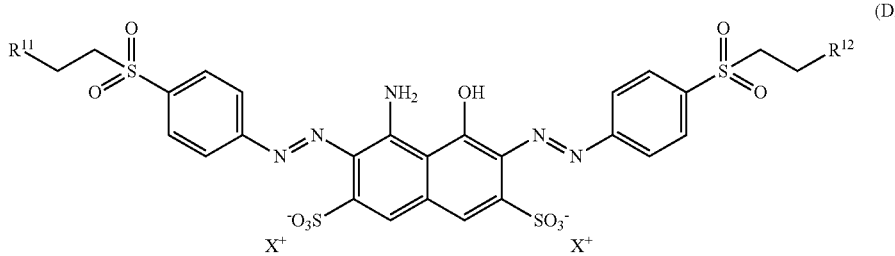

In Formula (D2), $R^{11}$ and $R^{12}$ each independently represent a hydrocarbon group that has 1 to 50 carbon atoms and that may include an oxygen atom, a nitrogen atom, or a sulfur atom, and two $X^+$'s represent an inorganic cation or an organic cation.

Note that at least one of the following is satisfied: at least one (more preferably two) of $R^{11}$ or $R^{12}$ is a group including an alkyl group having 4 or more carbon atoms, or at least one (more preferably two) of two $X^+$'s is an organic cation including an alkyl group having 4 or more carbon atoms.

For preferred examples of groups and cations in Formula (D2), reference can be appropriately made to preferred examples of groups and cations in Formula (D1).

From the viewpoint of providing a printed textile that is less likely to cause color staining of other textiles and has further improved texture, Formula (D2) preferably has a form in which at least one (more preferably two) of $R^{11}$ or $R^{12}$ is a group including an alkyl group having 4 or more carbon atoms, and two $X^+$'s are each independently $K^+$ or $Na^+$.

From the viewpoint of providing a printed textile that is less likely to cause color staining of other textiles and has further improved texture, the oil-soluble dye (D1) is more preferably an oil-soluble dye (D3) represented by the following Formula (D3).

at least one (more preferably two) of two $X^+$'s is an organic cation including an alkyl group having 4 or more carbon atoms.

For preferred examples of groups and cations in Formula (D3), reference can be appropriately made to preferred examples of groups and cations in Formula (D1).

From the viewpoint of providing a printed textile that is less likely to cause color staining of other textiles and has further improved texture, Formula (D3) preferably has a form in which at least one (more preferably at least two) of $R^{13}$ to $R^{16}$ is a group including an alkyl group having 4 or more carbon atoms, and two $X^+$'s are each independently $K^+$ or $Na^+$.

The water-insoluble dye is, from the viewpoint of further improving the texture of the printed textile, more preferably C.I. Solvent Black 3.

In the ink composition, the content of the water-insoluble dye is, from the viewpoint of improving the optical density of the printed textile, relative to the total amount of the ink composition, preferably 1 mass % to 10 mass %, more preferably 2 mass % to 8 mass %, still more preferably 3 mass % to 7 mass %.

Dispersing Agent

The ink composition includes a dispersing agent. The dispersing agent, which is not particularly limited as long as it is a polymer that can disperse a water-insoluble dye, from the viewpoint of dispersion stability, preferably includes at least one species of a hydrophilic group.

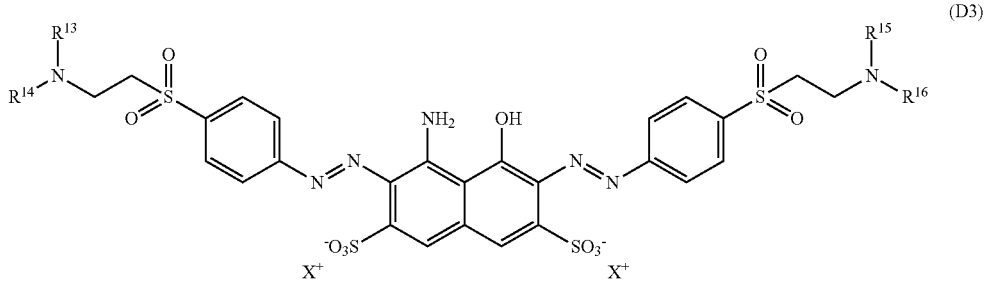

In Formula (D3), $R^{13}$ to $R^{16}$ each independently represent a hydrocarbon group that has 1 to 25 carbon atoms and that may include an oxygen atom, a nitrogen atom, or a sulfur atom or a hydrogen atom, and two $X^+$'s represent an inorganic cation or an organic cation.

Note that at least one of the following is satisfied: at least one (more preferably at least two) of $R^{13}$ to $R^{16}$ is a group including an alkyl group having 4 or more carbon atoms, or The hydrophilic group is preferably an anionic group or a nonionic group and, from the viewpoint of providing a strong effect of improving the dispersion stability, more preferably an anionic group.

For example, of an anionic group and a nonionic group that have the same molecular weight, the anionic group provides a stronger effect of improving the dispersion stability. Thus, the anionic group, even in the case of having a low molecular weight, can exert sufficiently the effect of improving the dispersion stability.

The nonionic group may be a group having a polyether structure, and is preferably a monovalent group including a polyalkyleneoxy group.

The anionic group may be neutralized or may not be neutralized.

Examples of the unneutralized anionic group include a carboxy group, a sulfo group, a sulfuric acid group, a phosphonic acid group, and a phosphoric acid group.

Examples of the neutralized anionic group include a salt of a carboxy group, a salt of a sulfo group, a salt of a sulfuric acid group, a salt of a phosphonic acid group, and a salt of a phosphoric acid group.

In the present disclosure, the term "neutralized anionic group" means an anionic group in the form of a "salt" (for example, a salt of a carboxy group (for example, —COONa)).

The neutralization can be performed using, for example, an alkali metal hydroxide (for example, sodium hydroxide or potassium hydroxide) or an organic amine (for example, tri ethyl amine).

The hydrophilic group in the dispersing agent is, from the viewpoint of the dispersion stability, preferably an anionic group, more preferably at least one species selected from the group consisting of a carboxy group, a salt of a carboxy group, a sulfo group, a salt of a sulfo group, a sulfuric acid group, a salt of a sulfuric acid group, a phosphonic acid group, a salt of a phosphonic acid group, a phosphoric acid group, and a salt of a phosphoric acid group, still more preferably at least one species selected from the group consisting of a carboxy group and a salt of a carboxy group.

In the above-described salt of a carboxy group, salt of a sulfo group, salt of a sulfuric acid group, salt of a phosphonic acid group, and salt of a phosphoric acid group, "salt" is preferably an alkali metal salt or an organic amine salt, more preferably an alkali metal salt. In the alkali metal salt, the alkali metal is preferably K or Na.

When the dispersing agent includes, as the hydrophilic group, an anionic group, and the total number of millimoles of the anionic group included in 1 g of the dispersing agent is defined as the acid value of the dispersing agent, the acid value of the dispersing agent is, from the viewpoint of the dispersion stability, preferably 0.10 mmol/g to 2.00 mmol/g, more preferably 0.30 mmol/g to 1.50 mmol/g.

When the dispersing agent has, as the hydrophilic group, an anionic group, the anionic group in the dispersing agent preferably has a degree of neutralization of 50% to 100%, more preferably 70% to 90%. The term "degree of neutralization" refers to, in the dispersing agent, a ratio of "the number of neutralized anionic groups" to "the total of the number of unneutralized anionic groups (for example, carboxy groups) and the number of neutralized anionic groups (for example, salts of carboxy groups)" (specifically, Number of neutralized anionic groups/(Number of unneutralized anionic groups+Number of neutralized anionic groups)). The degree of neutralization (%) of the dispersing agent can be measured by neutralization titration.

Weight-Average Molecular Weight (Mw)

The weight-average molecular weight (Mw) of the dispersing agent is, from the viewpoint of further improving the dispersion stability of the water-insoluble dye, preferably 5000 to 50000, more preferably 6000 to 40000, still more preferably 8000 to 30000, particularly preferably 10000 to 30000.

In the present disclosure, the weight-average molecular weight and the number-average molecular weight can be measured using a gel permeation chromatograph (GPC). Specifically, the measurement method is as follows. As the GPC, a product named "HLC-8020GPC" and manufactured by Tosoh Corporation is used; as the columns, three columns of a product named "TSKgel, SuperMultipore HZ-H" (4.6 mmID×15 cm) and manufactured by Tosoh Corporation are used; as the eluant, THF (tetrahydrofuran) is used. The measurement is performed at a sample concentration of 0.45 mass %, at a flow rate of 0.35 ml/min, at a sample injection amount of 10 µl, at a measurement temperature of 40° C., and with an RI (Refractive index) Detector. The calibration curve is created using, as standard samples, 8 samples of products manufactured by Tosoh Corporation and named "TSK polystyrene standards": "F-40", "F-20", "F-4", "F-1", "A-5000", "A-2500", "A-1000", and "n-propylbenzene".

Type of Dispersing Agent

Examples of a polymer used as a dispersing agent (hereafter, referred to as polymer P) include urethane resins, acrylic resins, polyester resins, polyether resins, polycaprolactone resins, polycarbonate resins, polybutadiene resins, polyisoprene resins, and polyolefin resins.

Such a term "urethane resin" means a resin including at least one species selected from the group consisting of a urethane bond, a urea bond, and a thiourethane bond. The urethane resin may include, in addition to such a bond, for example, a polyether chain, a polyester chain, a polycaprolactone chain, a polycarbonate chain, a polybutadiene chain, a polyisoprene chain, or a polyolefin chain.

From the viewpoint of providing a printed textile that is less likely to cause color staining of other textiles and has further improved texture, the polymer P is preferably a urethane resin (polyurethane). The polymer P preferably includes a structural unit represented by Formula (1) below (hereafter, also referred to as "Unit (1)"), and a structural unit represented by Formula (2) below (hereafter, also referred to as "Unit (2)").

Structural Unit Represented by Formula (1) (Unit (1))

When the polymer P includes the structural unit represented by Formula (1) below (hereafter, also referred to as "Unit (1)"), the polymer P may include a single species of Unit (1) alone, or may include two or more species of Unit (1).

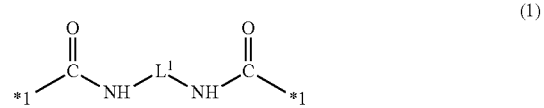

(1)

In Formula (1), $L^1$ represents a hydrocarbon group, and two *1's each represent a bonding site.

Unit (1) is preferably bonded to at least the structural unit represented by Formula (2) (hereafter, also referred to as "Unit (2)").

The hydrocarbon group represented by $L^1$ is not particularly limited.

The hydrocarbon group represented by $L^1$ may be a linear hydrocarbon group, may be a hydrocarbon group having a branch, may be a hydrocarbon group including an aromatic ring, or may be a hydrocarbon group including an alicyclic structure.

Examples of the hydrocarbon group represented by L' include a divalent hydrocarbon group being a single species selected from the group P1 consisting of an alkylene group that may include a branched structure and/or an alicyclic structure, an alkenylene group that may include a branched structure and/or an alicyclic structure, and an aryl group; and a divalent hydrocarbon group in which two or more species selected from the group P1 are bonded together.

The number of the carbon atoms of the hydrocarbon group represented by $L^1$ is preferably 1 to 20, more preferably 3 to 20, still more preferably 4 to 12.

The compound for forming Unit (1) (hereafter, also referred to as "Unit-(1)-forming compound") may be a diisocyanate compound having a structure in which two moieties "—NH(C=O)-*1" in Unit (1) are each replaced by an isocyanate group (—NCO group).

Specific examples of the Unit-(1)-forming compound are as follows.

However, the Unit-(1)-forming compound is not limited to the following specific examples.

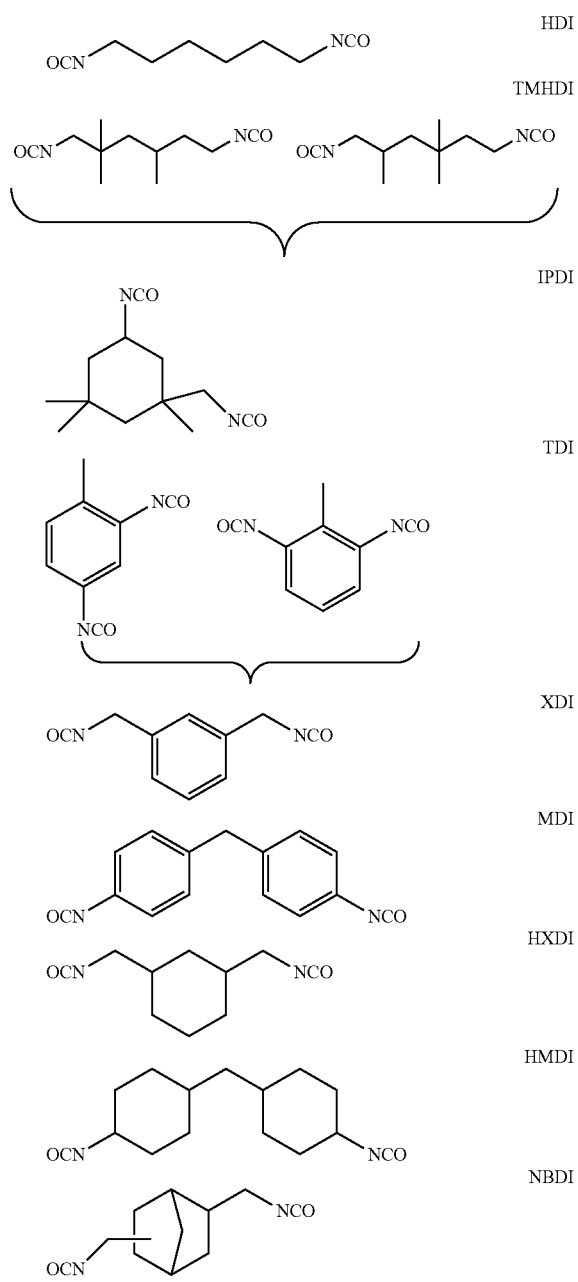

As bifunctional isocyanate compounds, bifunctional isocyanate compounds derived from the above-described specific examples are also usable. Examples of the bifunctional isocyanate compounds include DURANATE (registered trademark) D101, D201, and A101 (manufactured by Asahi Kasei Corporation).

Structural Unit Represented by Formula (2)

When the polymer P includes the structural unit represented by the following Formula (2) (hereafter, also referred to as "Unit (2)"), the polymer P may include a single species of Unit (2) alone, or may include two or more species of Unit (2).

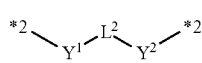

(2)

In Formula (2), $L^2$ represents a hydrocarbon group that has 2 to 50 carbon atoms and that may include an oxygen atom, a nitrogen atom, or a sulfur atom, or a polymer chain that is formed of a polyether chain, a polyester chain, a polycaprolactone chain, a polycarbonate chain, a polybutadiene chain, a polyisoprene chain, or a polyolefin chain and that has a number-average molecular weight of 500 or more, $Y^1$ and $Y^2$ each independently represent —O—, —S—, or —NRz-, Rz represents a hydrogen atom or a hydrocarbon group having 1 to 20 carbon atoms, and two *2's each represent a bonding site.

In the concept of the "hydrocarbon group that has 2 to 50 carbon atoms and that may include an oxygen atom, a nitrogen atom, or a sulfur atom", the hydrocarbon group that has 2 to 50 carbon atoms and that includes an oxygen atom, a nitrogen atom, or a sulfur atom means an organic group having a structure in which, in a hydrocarbon group composed only of carbon atoms and hydrogen atoms, at least one carbon atom is replaced by an oxygen atom, a nitrogen atom, or a sulfur atom, the organic group having 2 to 50 carbon atoms. As $L^2$, the hydrocarbon group that has 2 to 50 carbon atoms and that may include an oxygen atom, a nitrogen atom, or a sulfur atom (hereafter, also simply referred to as "hydrocarbon group represented by $L^2$") is preferably an alkylene group not substituted or having a substituent.

In the alkylene group having a substituent, examples of the substituent include alkoxy groups, alkylcarbonyloxy groups, alkylthio groups, an amino group, monoalkylamino groups, and dialkylamino groups.

Unit (2) is preferably bonded to at least Unit (1).

In Formula (2), the number of carbon atoms of the hydrocarbon group represented by $L^2$ is, from the viewpoint of providing a printed textile that is less likely to cause color staining of other textiles and has further improved texture, preferably 4 to 50, more preferably 6 to 40.

The hydrocarbon group represented by $L^2$ is, from the viewpoint of providing a printed textile that is less likely to cause color staining of other textiles and has further improved texture, preferably a chain hydrocarbon group that may include an oxygen atom, a nitrogen atom, or a sulfur atom, and that has a branched structure and 4 to 25 carbon atoms, more preferably an unsubstituted branched alkylene group having 6 to 25 carbon atoms, an alkoxylated branched alkylene group having 6 to 25 carbon atoms (specifically, a branched alkylene group substituted with an alkoxy group), or an alkylcarbonyloxylated branched alkylene group having 6 to 25 carbon atoms (specifically, a branched alkylene group substituted with an alkylcarbonyloxy group).

In the alkoxylated branched alkylene group having 6 to 25 carbon atoms, the number of carbon atoms of the alkoxy group is preferably 1 to 23, more preferably 4 to 22.

In the alkylcarbonyloxylated branched alkylene group having 6 to 25 carbon atoms, the number of carbon atoms of the alkylcarbonyloxy group is preferably 2 to 23, more preferably 6 to 22.

The chain hydrocarbon group represented by $L^2$ is, from the viewpoint of providing a printed textile that is less likely to cause color staining of other textiles and has further improved texture, also preferably an alkylene group substituted with a substituent A and having 2 or more carbon atoms.

The substituent A is preferably at least one species selected from the group consisting of a linear alkyl group having 2 or more carbon atoms, a branched alkyl group having 3 or more carbon atoms, a linear alkoxy group having 2 or more carbon atoms, a branched alkoxy group having 3 or more carbon atoms, a linear alkoxyalkyl group having 2 or more carbon atoms, and a branched alkoxyalkyl group having 3 or more carbon atoms.

The polymer chain represented by $L^2$ has a number-average molecular weight (Mn) of 500 or more.

Mn of the polymer chain represented by $L^2$ is preferably 500 to 50000, more preferably 1000 to 40000, still more preferably 1000 to 30000, still more preferably 1000 to 10000, particularly preferably 1000 to 5000.

The polymer chain represented by $L^2$ is formed of a polyether chain, a polyester chain, a polycaprolactone chain, a polycarbonate chain, a polybutadiene chain, a polyisoprene chain, or a polyolefin chain.

Examples of the polyether chain include a polyethylene glycol chain, a polypropylene glycol chain, and a polybutylene glycol chain. The polyether chain is preferably a polyethylene glycol chain or a polypropylene glycol chain.

The polyester chain may be a residue provided by removing the hydroxy groups at both terminals of Compound (2-17) PEs described later.

The polycaprolactone chain may be a residue provided by removing the hydroxy groups at both terminals of Compound (2-19) PCL described later.

The polycarbonate chain may be a residue provided by removing the hydroxy groups at both terminals of Compound (2-18) PC described later. The polycarbonate chain preferably includes an alkylene group having 2 to 12 (preferably 3 to 8, more preferably 3 to 6) carbon atoms, more preferably a residue provided by removing the hydroxy groups at both terminals of Compound (2-18) PC described later.

$L^2$ is, from the viewpoint of providing a printed textile that is less likely to cause color staining of other textiles and has further improved texture, preferably a polymer chain formed of a polycarbonate chain or a polyether chain and having a number-average molecular weight of 500 or more.

In Formula (2), $Y^1$ and $Y^2$ each independently represent —O—, —S—, or —NRz-, and Rz represents a hydrogen atom or a hydrocarbon group having 1 to 20 carbon atoms.

Rz is preferably a hydrogen atom or an alkyl group having 1 to 10 carbon atoms, more preferably a hydrogen atom or an alkyl group having 1 to 6 carbon atoms, still more preferably a hydrogen atom, a methyl group, or an ethyl group, still more preferably a hydrogen atom.

$Y^1$ and $Y^2$ are each independently preferably —O— or —S—, more preferably —O—.

The compound for forming Unit (2) (hereafter, also referred to as "Unit-(2)-forming compound") is preferably a compound having a structure in which, in Unit (2), "*2-$Y^1$—" and "—$Y^2$-*2" are each replaced by a hydroxy group, a thiol group, or an amino group (for example, a diol compound, a dithiol compound, or a diamine compound), more preferably a diol compound having a structure in which, in Unit (2), "*2-$Y^1$—" and "—$Y^2$-*2" are each replaced by a hydroxy group.

When the Unit-(2)-forming compound is used for forming Unit (2) in which $L^2$ is a polymer chain and is a diol compound, the Unit-(2)-forming compound is a polymer diol.

More specifically, the polymer diol may be polyetherdiol, polyesterdiol, polycaprolactonediol, polycarbonatediol, polybutadienediol, polyisoprenediol, or polyolefindiol.

Specific examples of the Unit-(2)-forming compound are as follows. However, the Unit-(2)-forming compound is not limited to the following specific examples.

(2-1)

(2-2)

(2-3)

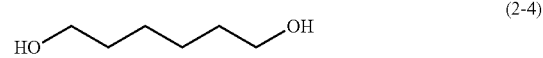

(2-4)

(2-5)

(2-6)

(2-7)

(2-8)

(2-9)

(2-10)

-continued

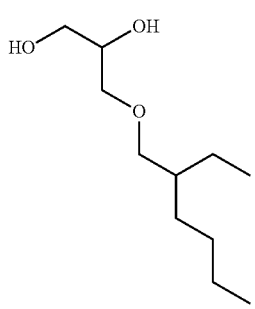

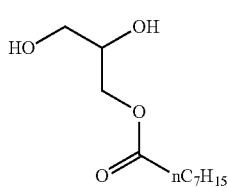

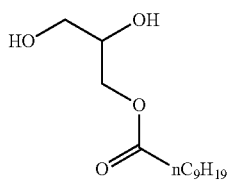

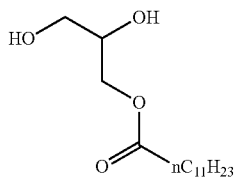

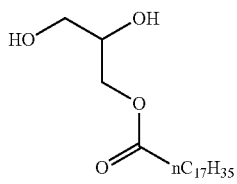

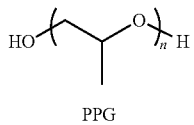

PPG

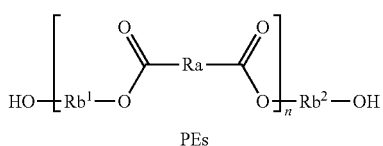

PEs

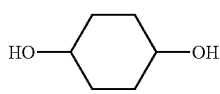

(2-11)

(2-12)

(2-13)

(2-14)

(2-15)

(2-16)

(2-17)

(2-a)

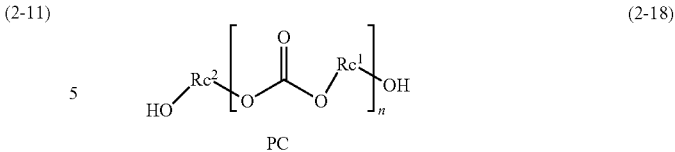

PC

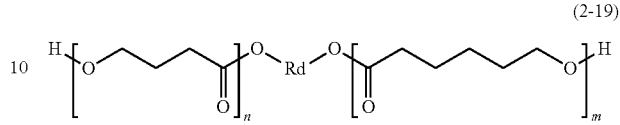

PCL

PEG

In Compounds (2-12) to (2-15), $nC_7H_{15}$, $nC_9H_{19}$, $nC_{11}H_{13}$, and $nC_{17}H_{35}$ respectively represent a normal heptyl group, a normal nonyl group, a normal undecyl group, and a normal heptadecyl group.

Compound (2-16) PPG is an example of polyetherdiol, namely, polypropylene glycol; n is the repeat number.

Compound (2-17) PEs is polyester diol; n is the repeat number; Ra, $Rb^1$, and $Rb^2$ each independently represent a divalent hydrocarbon group having 2 to 25 carbon atoms. In Compound (2-17) PEs, n Ra's may be the same or different. In Compound (2-17) PEs, n $Rb^1$'s may be the same or different.

Compound (2-18) PC is polycarbonatediol; n is the repeat number; $Rc^1$ and $Rc^2$ are each independently an alkylene group having 2 to 12 (preferably 3 to 8, more preferably 3 to 6) carbon atoms. In Compound (2-18) PC, n $Rc^1$'s may be the same or different.

Compound (2-19) PCL is polycaprolactonediol; n and m are the repeat numbers; Rd is an alkylene group having 2 to 25 carbon atoms.

Compound (2-22) PEG is an example of polyetherdiol, namely, polyethylene glycol; n is the repeat number.

Examples of the Unit-(2)-forming compound include, in addition to the above-described compounds, the following compounds.

(2-18)

(2-19)

(2-20)

(2-21)

(2-22)

(2-b)

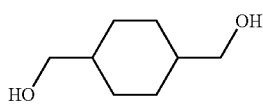

-continued
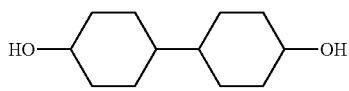
(2-c)
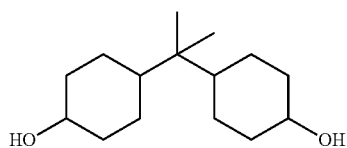
(2-d)
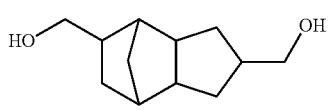
(2-e)
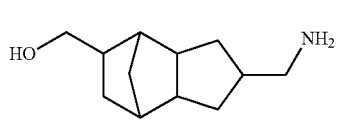
(2-f)
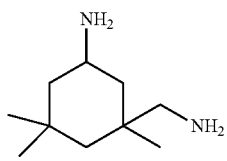
(2-g)
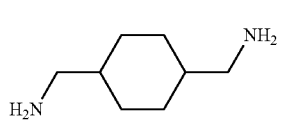
(2-h)
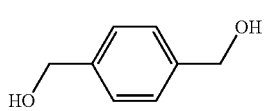
(2-i)
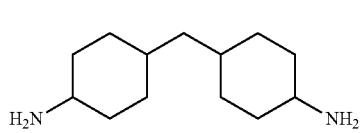
(2-j)
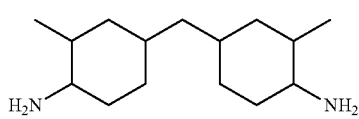
(2-k)
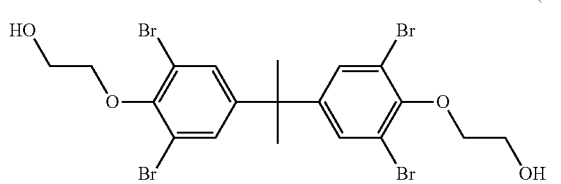
(2-L)
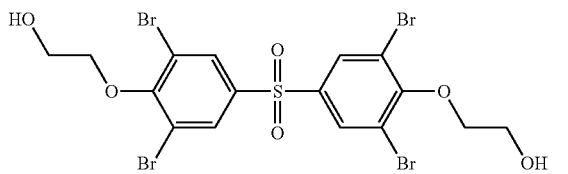
(2-m)
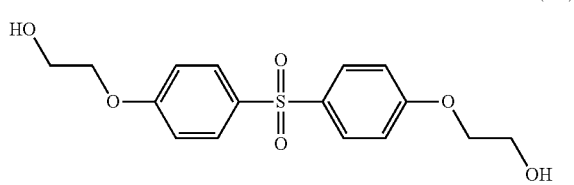
(2-n)
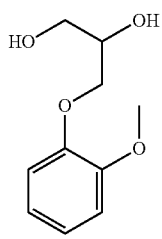
(2-o)
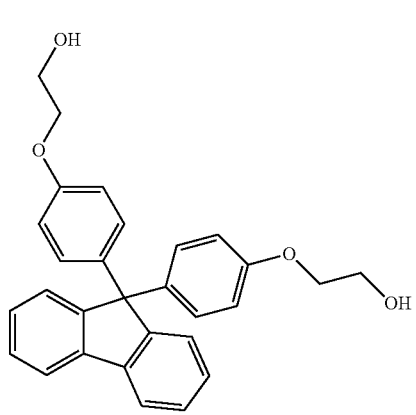
(2-p)
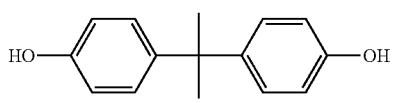
(2-q)
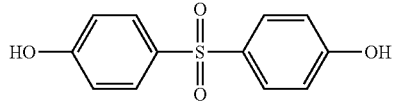
(2-r)
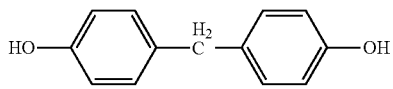
(2-s)
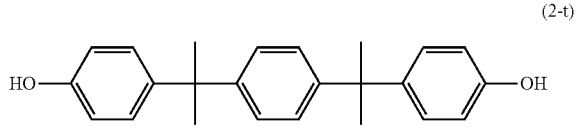
(2-t)

-continued
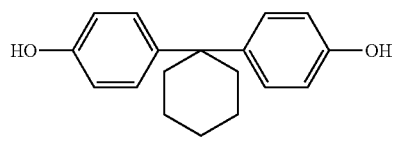
(2-u)
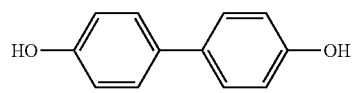
(2-v)
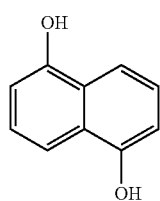
(2-w)
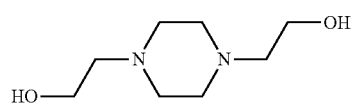
(2-x)
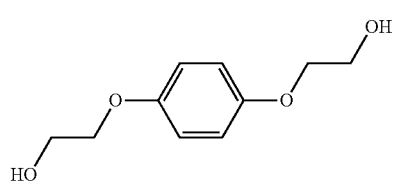
(2-y)
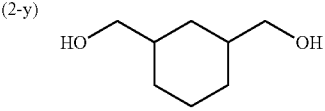
(2-z)
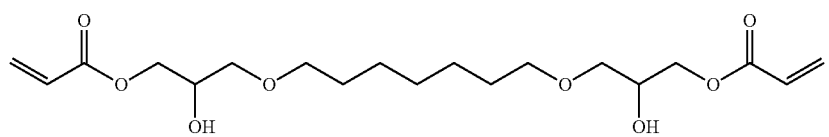
(2-101)
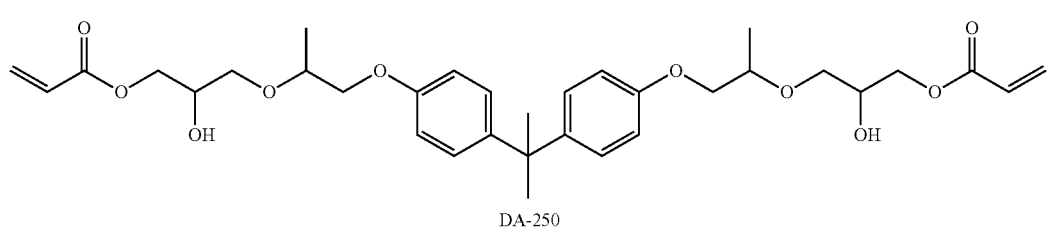
DA-250
(2-102)
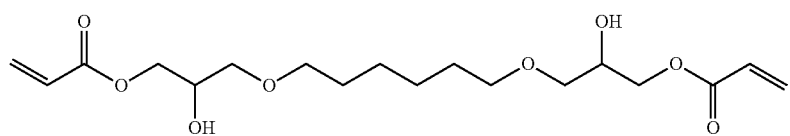
(2-103)
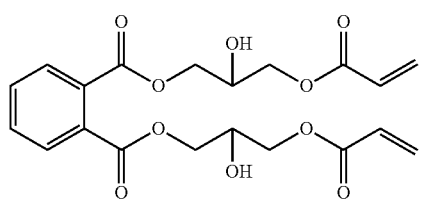
DA-721
(2-104)
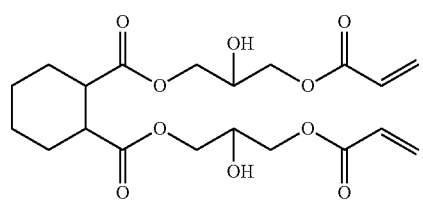
DA-722
(2-105)
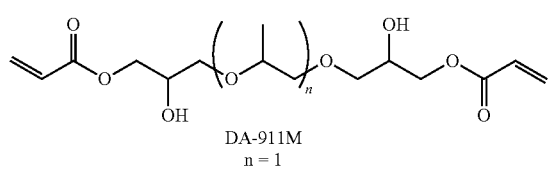
DA-911M
n = 1
(2-106)
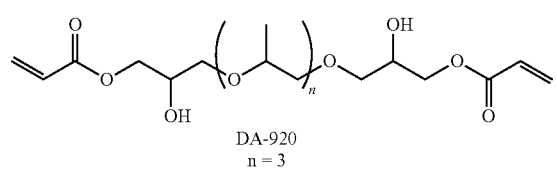
DA-920
n = 3
(2-107)

-continued

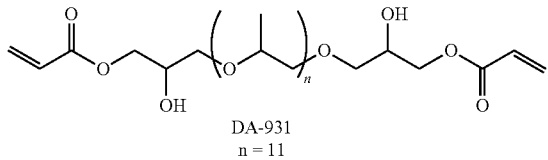
(2-108)
DA-931
n = 11

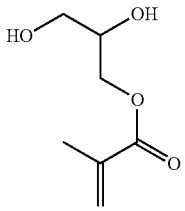
(2-109)

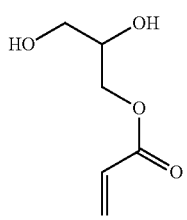
(2-110)

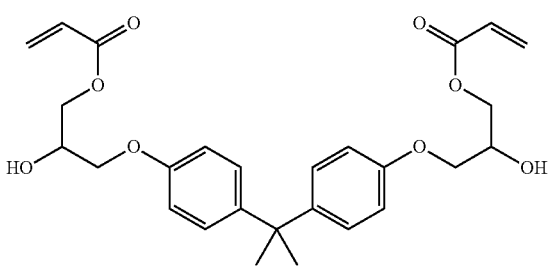
(2-111)

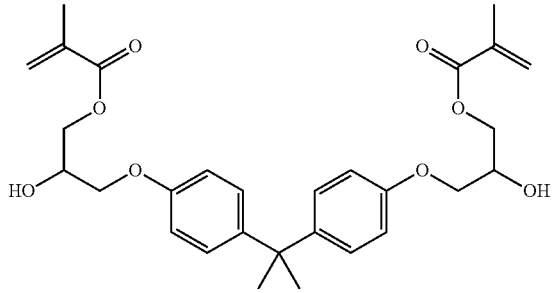
(2-112)

Examples of the Unit-(2)-forming compound include, in addition to the above-described compounds, polybutadienediol (hereafter, also referred to as "PBD"), polyisoprenediol (hereafter, also referred to as "PIP"), and polyolefindiol.

As such polymer diols serving as the Unit-(2)-forming compounds, commercially available products may also be used. Examples of the commercially available products include polycarbonatediol (product name: "DURANOL (registered trademark) T5651", manufactured by Asahi Kasei Chemicals Corporation). For the commercially available products of the polymer diols, reference may also be made to Paragraph 0111 in WO2016/152254A.

From the viewpoint of providing a printed textile that is less likely to cause color staining of other textiles and has further improved texture, the total content of Unit (1) and Unit (2) in the polymer P relative to the total amount of the polymer P is preferably 50 mass % or more, more preferably 60 mass % or more, still more preferably 80 mass % or more.

In the polymer P, the molar ratio of Unit (2) to Unit (1) (thus, Unit (2)/Unit (1)) is preferably 0.20 or more and less than 1.00, more preferably 0.30 or more and 0.90 or less, still more preferably 0.50 or more and 0.90 or less.

Structural Unit Having Hydrophilic Group

The polymer P preferably includes at least one species of a structural unit having a hydrophilic group.

Specific examples and preferred forms of the hydrophilic group are the same as those described above.

The structural unit having a hydrophilic group is preferably formed from, as a raw material, a hydrophilic-group-introducing compound described later.

The structural unit having a hydrophilic group is preferably a structural unit represented by the following Formula (3) (hereafter, also referred to as "Unit (3)").

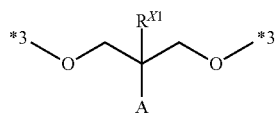
(3)

In Formula (3), $R^{X1}$ represents a hydrogen atom or an alkyl group having 1 to 10 carbon atoms; A represents an anionic group; and two *3's each represent a bonding site.

Unit (3) is preferably bonded to at least Unit (1).

Examples of the anionic group represented by A are the same as the above-described examples of the anionic group.

The anionic group represented by A is preferably a carboxy group or a salt of a carboxy group. The polymer P may include a form of Unit (3) in which A is a carboxy group and a form of Unit (3) in which A is a salt of a carboxy group.

Relative to the total amount of the polymer P, the content of the structural unit having a hydrophilic group (for example, Unit (3)) is preferably 3 mass % to 30 mass %, more preferably 5 mass % to 20 mass %.

Relative to the total amount of the polymer P, the content of the structural unit having an anionic group may be adjusted in consideration of the acid value (mmol/g) of the polymer P.

Hydrophilic-Group-Introducing Compound

A structural unit having a hydrophilic group can be introduced into the polymer P by using a hydrophilic-group-introducing compound.

Of such hydrophilic-group-introducing compounds, examples of an anionic-group-introducing compound include, a compound in which, in Unit (3), hydrogen atoms are individually bonded to two *3's; and amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Examples of the compound in which, in Unit (3), hydrogen atoms are individually bonded to two *3's include 2,2-dimethylolpropionic acid (DMPA) and 2,2-dimethylolbutanoic acid (DMBA).

The anionic-group-introducing compound may be treated with an inorganic base such as sodium hydroxide or potassium hydroxide or an organic base such as triethylamine such that the anionic groups are at least partially neutralized, and used.

The anionic groups may be neutralized during the forming process of the polymer P (for example, the forming process of coloring resin particles described later).

Of the hydrophilic-group-introducing compounds, a nonionic-group-introducing compound is preferably a compound having a polyether structure, more preferably a compound having a polyoxyalkylene group.

The polymer P may include, in addition to the above-described structural units, another structural unit. However, when the polymer P includes the structural unit having a hydrophilic group, from the viewpoint of the dispersion stability of the water-insoluble dye, the total content of Unit (1), Unit (2), and the structural unit having a hydrophilic group relative to the total amount of the polymer P is preferably 80 mass % or more.

Preferred Form of Polymer P

The polymer P preferably includes the structure of a reaction product of the Unit-(1)-forming compound (preferably, a diisocyanate compound having a structure in which, in Unit (1), two moieties "—NH(C=O)-*1" are each replaced by an isocyanate group (—NCO group)), the Unit-(2)-forming compound (preferably, a compound having a structure in which, in Unit (2), "*2-$Y^1$—" and "—$Y^2$-*2" are each replaced by a hydroxy group, a thiol group, or an amino group), and the hydrophilic-group-introducing compound (preferably, a compound in which, in Unit (3), hydrogen atoms are individually bonded to two *3's).

The polymer P preferably includes a urethane bond. Examples of the urethane bond include a urethane bond formed by bonding together Unit (1) and a form of Unit (2) in which $Y^1$ and $Y^2$ are each —O—, and a urethane bond formed by bonding together Unit (1) and Unit (3).

The structure of a terminal of the main chain of the polymer P is not particularly limited; a terminal group of the main chain of the polymer P is preferably an alkyl group having 1 to 20 (more preferably 1 to 10, still more preferably 1 to 6) carbon atoms.

The terminal alkyl group having 1 to 20 (more preferably 1 to 10, still more preferably 1 to 6) carbon atoms can be formed by, for example, using, as a terminal capping agent, an alcohol having 1 to 20 (more preferably 1 to 10, still more preferably 1 to 6) carbon atoms, a thioalcohol having 1 to 20 (more preferably 1 to 10, still more preferably 1 to 6) carbon atoms, or a monoalkylamine having 1 to 20 (more preferably 1 to 10, still more preferably 1 to 6) carbon atoms.

The polymer P is, from the viewpoint of providing a printed textile that is less likely to cause color staining of other textiles and has further improved texture, preferably a chain polymer. The term "chain polymer" means a polymer not including a cross-linked structure.

The chain polymer may include a ring structure. The chain polymer may include a branched structure.

The ratio of the content of the polymer P to the content of the water-insoluble dye (in other words, polymer P content/water-insoluble dye content) is, from the viewpoint of further improving the optical density of the printed textile, on the mass basis, preferably 0.10 to 4.00, more preferably 0.10 to 2.50, still more preferably 0.20 to 2.50, particularly preferably 0.20 to 1.50, still more preferably 0.25 to 1.00.

A preferred example of the method for synthesizing the polymer P is an example of causing a reaction of, in the presence of an oil organic solvent described later, the Unit-(1)-forming compound, the Unit-(2)-forming compound, and the hydrophilic-group-introducing compound.

This example of the synthesis method may be performed to synthesize a polymer having a form in which anionic groups serving as hydrophilic groups are not neutralized; this polymer may be used as one of the raw materials to prepare a coloring resin particle dispersion liquid described later; in the preparation stage, anionic groups of the polymer may be neutralized, to form the polymer P.

Coloring Resin Particle Dispersion Liquid

The ink composition can be produced by, for example, mixing together a water-insoluble dye, a dispersing agent, water, and the like to perform dispersion treatment. The dispersion liquid produced by mixing together a water-insoluble dye, a dispersing agent, water, and the like to perform dispersion treatment is referred to as "coloring resin particle dispersion liquid". The ink composition may be produced by adding, to the coloring resin particle dispersion liquid, another component.

The coloring resin particle dispersion liquid may include, in addition to the water-insoluble dye, the dispersing agent, and water, another component.

From the viewpoint of providing a printed textile that is less likely to cause color staining of other textiles and has further improved texture, in the coloring resin particle dispersion liquid, the total content of water and the coloring resin particles relative to the total amount of the coloring resin particle dispersion liquid is preferably 80 mass % or more.

Example of Method for Producing Coloring Resin Particle Dispersion Liquid

The production method for producing the coloring resin particle dispersion liquid is not particularly limited.

Hereinafter, an example of the method for producing the coloring resin particle dispersion liquid (hereafter, also referred to as "production method A") will be described.

The production method A includes a step of preparing an oil-phase component including an oil organic solvent, the polymer P or the polymer P in which anionic groups serving as hydrophilic groups are to be neutralized, and an oil-soluble dye, a step of preparing an aqueous-phase component including water (and a neutralizer as needed), and an emulsification step of mixing together the oil-phase component and the aqueous-phase component, and emulsifying the resultant mixture to obtain an emulsion.

In the production method A, the emulsification step is performed to form the coloring resin particles and to disperse the formed coloring resin particles in water. This provides a coloring resin particle dispersion liquid in which coloring resin particles are dispersed in water.

The term "coloring resin particles" means particulates in which the surfaces of the water-insoluble dye are covered with the dispersing agent. Note that the dispersing agent may cover the whole surfaces of the water-insoluble dye, or may cover only portions of the surfaces of the water-insoluble dye.

The term "oil organic solvent" means an organic solvent that has a solubility of 10 mass % or less in water at 20° C. The solubility of the oil organic solvent in water at 20° C. is preferably 5 mass % or less, more preferably 1 mass % or less. When the solubility of the oil organic solvent in water at 20° C. is 5 mass % or less, the oil (organic component) and water become less miscible during emulsification, to further improve the synthesis suitability and the stability of the coloring resin particles. The production method A may employ a single oil organic solvent alone or two or more oil organic solvents.

The oil organic solvent may be an oil organic solvent having volatility or an oil organic solvent having nonvolatility. Of these, the oil organic solvent having nonvolatility has a higher probability of being present in the coloring resin particles. The term "oil organic solvent having volatility" means an oil organic solvent that has a boiling point of less than 100° C. Examples of the oil organic solvent having volatility include ester-based solvents such as ethyl acetate and ketone-based solvents such as methyl ethyl ketone.

The term "organic solvent having nonvolatility" means an oil organic solvent that has a boiling point of more than 100° C. The oil organic solvent having nonvolatility is, from the viewpoint of exhibiting nonvolatility during the reaction and from the viewpoint of the preservation stability of the ink composition, preferably an oil organic solvent having a boiling point of 180° C. or more. Note that, in the present disclosure, the boiling point is the value of a boiling point under standard conditions (1 atm, 25° C.). 1 atm is 101.325 kPa.

Specific examples of the oil organic solvent having nonvolatility include non-halogen phosphoric acid esters (for example, TCP manufactured by DAIHACHI CHEMICAL INDUSTRY CO., LTD.), alkyl group-substituted aromatic compounds (for example, alkene KS-41 manufactured by JXTG Energy Corporation, and KMC500 manufactured by Kureha Chemical Industry Co., Ltd.), long-chain alkyl group-substituted ester compounds (for example, methyl laurate KS-33 manufactured by NOF CORPORATION, and glycerol tris(2-ethylhexanoate) manufactured by FUJIFILM Wako Pure Chemical Corporation), dibasic acid esters (for example, DBE manufactured by INVISTA, dimethyl succinate, dimethyl glutarate, and diisopropyl succinate manufactured by Tokyo Chemical Industry Co., Ltd.), and alkylene glycol derivatives (for example, manufactured by Tokyo Chemical Industry Co., Ltd., ethylene glycol monobutyl ether acetate, diethylene glycol monobutyl ether acetate, diethylene glycol dibutyl ether, and diethylene glycol dibenzoate).

Of these, the oil organic solvent having nonvolatility is preferably DBE, dimethyl succinate, dimethyl glutarate, diisopropyl succinate, glycerol tris(2-ethylhexanoate), diethylene glycol monobutyl ether acetate, or diethylene glycol dibutyl ether.

In the case of using, as the oil-phase component, an oil-phase component including the polymer P in which anionic groups serving as hydrophilic groups are to be neutralized and using, as the aqueous-phase component, an aqueous-phase component including water and a neutralizer, in the emulsification step, in the polymer P in which anionic groups are to be neutralized, anionic groups are at least partially neutralized, to thereby form coloring resin particles containing the polymer P including neutralized anionic groups (for example, —COONa).

As the neutralizer, a basic compound such as sodium hydroxide, potassium hydroxide, or triethylamine is usable.

In the emulsification step, the process of performing emulsification is not particularly limited, but may be, for example, emulsification using an emulsification apparatus such as a homogenizer (for example, a dispersing machine).

In the emulsification, the number of revolutions of the dispersing machine is, for example, 5000 rpm to 20000 rpm, preferably 10000 rpm to 15000 rpm. This term "rpm" is the abbreviation of revolutions per minute.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the emulsification step, emulsification may be performed under heating. Such emulsification under heating enables more efficient formation of the coloring resin particles. In addition, the emulsification under heating facilitates removal of at least partially the oil organic solvent in the oil-phase component from the mixture.

In the case of performing emulsification under heating, the heating temperature is preferably 35° C. to 70° C., more preferably 40° C. to 60° C.

The production method A may include a heating step of heating the emulsion or a mixture of the emulsion and water to remove at least partially the oil organic solvent.

In the heating step, the heating temperature is preferably 35° C. to 70° C., more preferably 40° C. to 60° C.

Water

The ink composition includes water. The water content in the ink composition relative to the total amount of the ink composition is preferably 40 mass % or more, more preferably 50 mass % or more, still more preferably 60 mass % or more. The upper limit value of the water content, though it depends on the solid content of the ink composition, is, relative to the total amount of the ink composition, for example, 90 mass %.

Aqueous Organic Solvent

The ink composition preferably includes an aqueous organic solvent. The ink composition may include a single aqueous organic solvent or two or more aqueous organic solvents.

Preferred examples of the aqueous organic solvent that can be contained in the ink composition are the same as the above-described preferred examples of the aqueous organic solvent that can be contained in the pretreatment liquid.

In the ink composition, the aqueous organic solvent content relative to the total amount of the ink composition is preferably 5 mass % to 60 mass %, more preferably 10 mass % to 50 mass %, still more preferably 15 mass % to 40 mass %. When the aqueous organic solvent content is within such a range, the ink composition has high preservation stability and also, in the case of being ejected by an ink jet recording process, exhibits high ejection performance.

Cross-Linking Agent

The ink composition may further include a cross-linking agent. The cross-linking agent is preferably a compound that has at least two cross-linking groups. The cross-linking agent has a cross-linking group that is preferably a carboxy group, a hydroxy group, a sulfonic group, or an amide group.

Examples of the cross-linking agent include blocked isocyanate-based compounds, oxazoline-based compounds, and carbodiimide compounds. In particular, preferred cross-linking agents are blocked isocyanate-based compounds provided by blocking, using a blocking agent, TMP (trimethylolpropane) adducts or isocyanurates of diisocyanates (for example, HDI (hexamethylene diisocyanate), H6XDI (hydrogenated xylylene diisocyanate), IPDI (isophorone diisocyanate), and H12MDI (dicyclohexylmethane diisocyanate)); and carbodiimide compounds.

For the blocked isocyanate-based compounds, the blocking agent is, from the viewpoint of unblocking temperature, preferably DEM (diethyl malonate), DIPA (diisopropylamine), TRIA (1,2,4-triazole), DMP (3,5-dimethylpyrazole), or MEKO (butanone oxime).

Such a blocked isocyanate-based compound can also be used as an oligomer provided by causing partially the isocyanate groups to react with polyol, polycarbonate, polyester, or polyether.

As the carbodiimide compounds, examples include CARBODILITE cross-linking agents for aqueous resins, E-02, E-03A, and E-05 (all are product names) manufactured by Nisshinbo Chemical Inc.; and, from the viewpoint of preservation stability and reactivity, preferred is E-05.

As the unblocking temperature of the cross-linking agent, from the viewpoint of cross-linking efficiency, the lower the unblocking temperature, the more preferable it is; from the viewpoint of preservation stability, the higher the unblocking temperature, the more preferable it is. From the viewpoint of the balance between cross-linking efficiency and preservation stability, the unblocking temperature is preferably 90° C. to 180° C., more preferably 90° C. to 120° C., particularly preferably 110° C. to 120° C.

The cross-linking agent is preferably contained, as a cross-linking agent having a hydrophilic group and having water-solubility or self-emulsifiability, in the ink composition. The cross-linking agent having water-solubility or self-emulsifiability is made to be contained in the ink composition, to thereby lower the viscosity of the ink composition, to improve the re-dispersibility.

The cross-linking agent may be cross-linking agent particles. The cross-linking agent particles preferably have an average particle size of, in the case of ejecting the ink composition by an ink jet recording process, from the viewpoint of the ejection performance, 200 nm or less.

The average particle size can be the value of a volume-average particle size (MV) measured using a particle size distribution analyzer (product name "Nanotrac UPA EX150", manufactured by NIKKISO CO., LTD.).

The cross-linking agent particles are not particularly limited, and examples include ELASTRON BN-77 (blocked isocyanate, particle size: 19 nm, unblocking temperature: 120° C. or more, manufactured by DAI-ICHI KOGYO SEIYAKU CO., LTD.), ELASTRON BN-27 (blocked isocyanate, particle size: 108 nm, unblocking temperature: 180° C. or more, manufactured by DAI-ICHI KOGYO SEIYAKU CO., LTD.), Duranate WM44-70G (blocked isocyanate, particle size: 42 nm, unblocking temperature: about 90° C., manufactured by Asahi Kasei Corporation), and TRIXENE AQUA BI200 (blocked isocyanate, particle size: 94 nm, unblocking temperature: 110-120° C., manufactured by BAXENDEN Chemicals Ltd.).

When the ink composition contains a cross-linking agent, in the ink composition, the cross-linking agent content relative to the total amount of the ink composition is preferably 0.1 mass % to 10 mass %, more preferably 0.5 mass % to 8 mass %, still more preferably 1 mass % to 5 mass %.

Pigment

The ink composition may further include, from the viewpoint of adjusting the hue or improving the color density, a pigment.

Examples of the pigment include
carbon black, aniline black;
C.I. Pigment Yellow 3, 12, 53, 55, 74, 81, 83, 93, 94, 95, 97, 98, 100, 101, 104, 108, 109, 110, 117, 120, 128, 138, 153, 155, 180, 185;
C.I. Pigment Red 112, 114, 122, 123, 146, 149, 166, 168, 170, 172, 177, 178, 179, 185, 190, 193, 202, 206, 209, 219;
C.I. Pigment Violet 19, 23;
C.I. Pigment Orange 36, 43, 64;
C.I. Pigment Blue 15, 15:1, 15:2, 15:3, 15:4, 15:6, 16, 17:1, 56, 60, 63; and
C.I. Pigment Green 36.

When the ink composition includes the pigment, in the ink composition, the pigment content relative to the total amount of the ink composition is preferably 0.5 mass % to 10 mass %, more preferably 0.5 mass % to 8 mass %, still more preferably 0.5 mass % to 5 mass %.

In the preparation of the ink composition, an aqueous dispersion liquid of the pigment prepared by using a dispersing agent to disperse the pigment in water (also referred to as "aqueous pigment dispersion liquid") is also usable. As the aqueous pigment dispersion liquid, for example, a pigment dispersion described in JP2012-7148A is usable. As the aqueous pigment dispersion liquid, commercially available products such as Pro-jet Black APD1000 (manufactured by Fujifilm Imaging Colorants Inc.) are also usable.

As the pigment, self-dispersible pigments are also usable. Such a self-dispersible pigment is a pigment that is dispersible in water without using a dispersing agent. The self-dispersible pigment is, for example, a pigment in which, to its surfaces, at least one species selected from the group consisting of hydrophilic groups such as a carbonyl group, a hydroxy group, a carboxy group, a sulfo group, and a phosphoric acid group and salts of the foregoing is introduced directly or using a chemical bond to another group on the surfaces.

The self-dispersible pigment is preferably self-dispersible carbon black. Examples of the self-dispersible pigment include commercially available products such as self-dispersible carbon black CAB-O-JET 200, CAB-O-JET 300, and CAB-O-JET 400 (all are manufactured by Cabot Corporation), BONJET CW-1 (carboxy group: 500 μmol/g), BONJET CW-2 (carboxy group: 470 μmol/g) (all are manufactured by ORIENT CHEMICAL INDUSTRIES CO., LTD.), and Aqua-Black 162 (carboxy group: about 800 μmol/g) from TOKAI CARBON CO., LTD.

Wax

The ink composition may include wax. The wax is preferably present in the form of particles in the ink composition. Hereafter, the wax present in the form of particles will be referred to as "wax particles".

As the wax particles, a dispersion liquid in which the wax is dispersed in water is preferably used.

The wax is preferably polyethylene wax, paraffin wax, or carnauba wax.

The melting point of the wax is, from the viewpoint of improving the stability and the frictional properties, preferably in the range of 60° C. to 120° C., more preferably in the range of 60° C. to 100° C. Such a wax having a melting point of 60° C. or more can improve the stability of the ink composition. On the other hand, such a wax having a melting point of 120° C. or less is effective for improving the frictional properties. The melting point of the wax can be measured using an ordinary melting point measurement apparatus.

The volume-average particle size of the wax particles is, in the case of ejecting the ink composition by an ink jet recording process, from the viewpoint of the ejection performance, preferably 0.3 µm or less, more preferably 0.2 µm or less, still more preferably 0.1 µm or less. The volume-average particle size of the wax particles can be measured by the same method as in the volume-average particle size of the coloring resin particles.

When the ink composition includes wax, the wax content relative to the total amount of the ink composition is preferably 0.1 mass % to 10 mass %, more preferably 0.5 mass % to 8 mass %, still more preferably 1 mass % to 5 mass %.

As the wax particles, commercially available products may be used. Examples of the commercially available products include Polyron L-787 (manufactured by Chukyo Yushi Co., Ltd., polyethylene wax, nonionic, melting point: 102° C., volume-average particle size: 0.1 µm), Hidorin-703 (manufactured by Chukyo Yushi Co., Ltd., paraffin wax, anionic, melting point: 75° C., volume-average particle size: 0.1 µm), R108 (manufactured by Chukyo Yushi Co., Ltd., paraffin wax, nonionic, melting point: 66° C., volume-average particle size: 0.2 µm), and Selosol 524 (manufactured by Chukyo Yushi Co., Ltd., carnauba wax, nonionic, melting point: 83° C., volume-average particle size: 0.07 µm).

Surfactant

The ink composition may include at least one surfactant.

The surfactant is not particularly limited, and publicly known surfactants such as silicone-based surfactants, fluorosurfactants, and acetylene glycol-based surfactants are usable.

When the ink composition includes a surfactant, the surfactant content relative to the total amount of the ink composition is preferably 0.05 mass % to 2.0 mass %, more preferably 0.1 mass % to 2.0 mass %.

Other Component

The ink composition may include, in addition to the above-described components, another component.

Examples of the other component include a pH adjusting agent, a fluorescent brightening agent, a surface tension modifier, an anti-foaming agent, an anti-drying agent, a lubricant, a thickener, an ultraviolet absorbent, an anti-fading agent, an antistatic agent, a matting agent, an antioxidant, a resistivity control agent, an anticorrosive, a reduction inhibitor, a preservative, a fungicide, and a chelating agent.

For the other component, reference may be made to descriptions in WO2017/131107A.

Properties of Ink Composition

The ink composition preferably has a surface tension of 20 mN/m to 70 mN/m, more preferably 25 mN/m to 60 mN/m. The term "surface tension" means a value measured at 25° C.

The surface tension can be measured by using a surface tensiometer such as a product name "Automatic Surface Tentiometer CBVP-Z (manufactured by Kyowa Interface Science Co., Ltd.)".

The ink composition preferably has a viscosity of 40 mPa·s or less, more preferably 30 mPa·s or less. The term "viscosity" is a value measured at 25° C.

The viscosity can be measured by using a viscometer such as a product name "VISCOMETER TV-22 viscometer (manufactured by Toki Sangyo Co., Ltd.)".

Textile Printing Method

The textile printing method according to the present disclosure preferably includes a pretreatment liquid application step of applying the pretreatment liquid included in the ink set, to a textile, and an ink application step of applying the ink composition included in the ink set, to the textile to which the pretreatment liquid has been applied.

The textile printing method according to the present disclosure employs the ink set according to the present disclosure, to thereby provide a printed textile that is less likely to cause color staining of other textiles and has good texture.

Pretreatment Liquid Application Step

In the textile printing method according to the present disclosure, first, the pretreatment liquid included in the ink set is applied to a textile.

Textile

Examples of the type of fiber in the textile include synthetic fibers such as nylon, polyester, and acrylonitrile; semi-synthetic fibers such as acetate and rayon; natural fibers such as cotton, silk, and fur; and mixed fibers composed of two or more selected from the group consisting of synthetic fibers, semi-synthetic fibers, and natural fibers.

The fiber in the textile is preferably at least one species selected from the group consisting of cotton and polyester. Examples of the form of the textile include woven fabrics, knitted fabrics, and nonwoven fabrics. The textile may be a textile for a textile product.

Examples of the textile product include clothing items (for example, T-shirts, sweatshirts, jerseys, pants, sweat suits, one-piece dresses, and blouses), bedclothes, and handkerchiefs.

Application of Pretreatment Liquid

The process of applying the pretreatment liquid to the textile is not particularly limited, and examples include a coating process, a padding process, an ink jet process, a spraying process, and a screen printing process. Of these, from the viewpoint of improving the texture of the resultant printed textile, the process of applying the pretreatment liquid to the textile is preferably an ink jet process. Thus, the ink jet recording process is preferably used to apply the pretreatment liquid.

As the ink jet recording process, ordinary and publicly known processes are usable; examples include a charge control process of using the electrostatic attractive force to eject the pretreatment liquid, a drop-on-demand process (pressure pulse process) of using the vibration pressure of piezoelectric elements, an acoustic ink jet process of transforming electric signals into acoustic beams and radiating them to the pretreatment liquid to use the radiation pressure to eject the pretreatment liquid, and a thermal ink jet process of heating the pretreatment liquid to form bubbles and using the resultant pressure.

In general, as the image recording systems in ink jet recording apparatuses, there are a shuttle scan system (also referred to as "serial head system") of using a short serial head to perform image recording, and a single pass system (also referred to as "line head system") of using a line head in which recording elements are arranged so as to correspond to the whole region of the recording medium in the width direction to perform image recording. In the shuttle scan system, the serial head is scanned in the width direction of the recording medium to perform image recording. By contrast, in the single pass system, the recording medium is scanned in a direction orthogonal to the arrangement direction of the recording elements to thereby perform image recording over the whole surface of the recording medium.

Thus, in the single pass system, unlike the shuttle scan system, the transport mechanism such as a carriage for scanning the serial head is not necessary. In addition, in the single pass system, movement of the carriage and the complicated scanning control of the carriage relative to the recording medium are not necessary, and only the recording medium is moved, to thereby achieve an increase in the recording speed, compared with the shuttle scan system.

In the pretreatment liquid application step, the pretreatment liquid is preferably applied by the single pass system.

The ink jet head ejects the pretreatment liquid in a drop volume of preferably 1 pL (picoliter) to 150 pL, more preferably 2 pL to 120 pL, particularly preferably 20 pL to 60 pL. Note that the term "drop volume" means the volume of the ink ejected once from a single nozzle by an ink jet recording process.

The amount of the pretreatment liquid applied is, from the viewpoint of texture, preferably 10 $g/m^2$ to 30 $g/m^2$, more preferably 15 $g/m^2$ to 25 $g/m^2$.

The pretreatment liquid is ejected at a resolution of, preferably 200 dpi (dot per inch) or more×200 dpi or more, more preferably 400 dpi or more×400 dpi or more and 1200 dpi or less×1200 dpi or less. Note that "dpi" means the number of dots per 25.4 mm.

In the pretreatment liquid application step, the pretreatment liquid is preferably applied using an ink jet recording apparatus having a liquid circulation mechanism for circulating the pretreatment liquid between the liquid tank and the ink jet head. The ink jet recording apparatus having the liquid circulation mechanism is specifically an apparatus configured to supply, from the liquid tank storing the pretreatment liquid, the pretreatment liquid to the ink jet head, and to collect the pretreatment liquid from the ink jet head to the liquid tank, to thereby circulate the pretreatment liquid between the liquid tank and the ink jet head for ejecting the pretreatment liquid. When the pretreatment liquid remains in the near-nozzle region, the pretreatment liquid dries, which tends to cause clogging of the nozzles, which tends to lead to ejection failure. In the case where the pretreatment liquid is ejected only in an amount smaller than the predetermined ejection amount, that is, ejection failure occurs, the pretreatment liquid's effect of aggregating the ink composition may not be sufficiently exerted. On the other hand, in the case where the pretreatment liquid is ejected at high performance, the pretreatment liquid's effect of aggregating the ink composition is sufficiently exerted, to make the resultant printed textile be less likely to cause color staining of other textiles. In the case of using the ink jet recording apparatus having the liquid circulation mechanism, the pretreatment liquid in the near-nozzle region is continuously renewed, and the pretreatment liquid can be ejected with stability, so that the resultant printed textile is even less likely to cause color staining of other textiles.

Ink Application Step

In the textile printing method according to the present disclosure, after the pretreatment liquid application step, the ink composition included in the ink set is applied to the textile to which the pretreatment liquid has been applied.

Application of Ink Composition

The process of applying the ink composition to the textile to which the pretreatment liquid has been applied is not particularly limited and examples include a coating process, a padding process, an ink jet process, a spraying process, and a screen printing process. Of these, the process of applying the ink composition is, from the viewpoint of improving the texture of the resultant printed textile, preferably an ink jet process. Thus, the ink jet recording process is preferably used to apply the ink composition. The ink jet recording process is the same as that described in the "Pretreatment liquid application step" section.

In the ink application step, the ink composition is preferably applied by the single pass system.

The ink jet head ejects the ink composition in a drop volume of preferably 1 pL (picoliter) to 150 pL, more preferably 2 pL to 120 pL, particularly preferably 20 pL to 60 pL. Note that the term "drop volume" means the volume of ink ejected once from a single nozzle by an ink jet recording process.

The amount of the ink composition applied is, from the viewpoint of texture, preferably 10 $g/m^2$ to 30 $g/m^2$, more preferably 15 $g/m^2$ to 25 $g/m^2$.

The ink composition is ejected preferably at a resolution of 200 dpi or more×200 dpi or more, more preferably 400 dpi or more×400 dpi or more and 1200 dpi or less×1200 dpi or less.

In the ink application step, the ink composition is preferably applied using an ink jet recording apparatus having a liquid circulation mechanism for circulating the ink composition between the liquid tank and the ink jet head.

Heat Treatment Step

The textile printing method according to the present disclosure may have a heat treatment step of, after the ink application step, heat-treating the textile to which the ink composition has been applied. Examples of the heat treatment device include a heating drum, hot air, an infrared lamp, a heating oven, a heating plate, a heat press, and a hot plate. The heat treatment temperature is preferably 200° C. or less, more preferably 100° C. to 180° C., still more preferably 120° C. to 170° C. The heat treatment time is preferably 5 seconds to 200 seconds, more preferably 30 seconds to 160 seconds.

The textile printing method according to the present disclosure may include, in addition to the above-described steps, another step. Examples of the other step include a posttreatment step of posttreating, using a posttreatment agent, the colored textile having been subjected to the heat treatment step.

EXAMPLES

Hereinafter, the present disclosure will be described more specifically with reference to Examples; however, the present disclosure, within the spirit and scope thereof, is not limited to the following Examples.

Example 1

Preparation of Pretreatment Liquid

The following components were mixed together and stirred for 60 minutes, to thereby prepare a pretreatment liquid having a quaternary ammonium cation content of 10 mass %.

Quaternary ammonium salt: benzyldimethyldodecylammonium chloride (product name: "QBA-1211-S", manufactured by TAKEMOTO OIL & FAT Co., Ltd., solid content concentration: 50 mass %) . . . 22.3 mass %

Solvent: 2-pyrrolidone . . . 25.0 mass %

Surfactant: product name: "OLFINE E1010", manufactured by Nissin Chemical Industry Co., Ltd . . . . 1.0 mass %

Water . . . remainder (mass %) of the total mass of the pretreatment liquid defined as 100 mass %

Preparation of Ink Composition
Synthesis of Dispersing Agent (Polyurethane)

Into a three-neck flask, 176.2 g of hexamethylene diisocyanate (HDI), 68.1 g of 2,2-dimethylolpropionic acid (DMPA), 491.9 g of polycarbonatediol (product name: "DURANOL (registered trademark) T5651", manufactured by Asahi Kasei Chemicals Corporation), and 1202.62 g of ethyl acetate were charged, and heated at 70° C.

Note that DURANOL (registered trademark) T5651 is the above-described Compound (2-18) PC where $Rc^1$ and $Rc^2$ are each an alkylene group having 5 or 6 carbon atoms, and Mn is 1000.

Subsequently, to the three-neck flask, 2.454 g of an inorganic bismuth catalyst (product name: "NEOSTANN U-600" manufactured by Nitto Kasei Co., Ltd.) was added and stirring was performed at 70° C. for 5 hours. Furthermore, 515.41 g of isopropyl alcohol and 711.75 g of ethyl acetate were added, and stirring was performed at 70° C. for 3 hours. After the stirring, the reaction solution was left to cool to room temperature (23° C.). Ethyl acetate was used to adjust the concentration to thereby provide a 30 mass % solution of polyurethane (solvent: mixed solution of ethyl acetate/isopropyl alcohol).

Note that a portion of the isopropyl alcohol also functions as a terminal capping agent for the polyurethane. The polyurethane was found to have a weight-average molecular weight of 15000 and an acid value of 0.69 mmol/g.

Preparation of Dispersion Liquid of Coloring Resin Particles
Preparation of Oil-Phase Component Ethyl acetate, the 30 mass % solution of polyurethane, and an oil-soluble dye C.I. Solvent Black 3 (trade name: "Oil Black 860", manufactured by ORIENT CHEMICAL INDUSTRIES CO., LTD., "SB-3" in Tables) were mixed together and stirred for 15 minutes, to thereby provide 149.8 g of an oil-phase component having a solid content of 30 mass %.

In the preparation of the oil-phase component, the amounts of the 30 mass % solution of polyurethane and SB-3 used were adjusted such that, in the oil-phase component, the SB-3 content was 1.5 times the polyurethane content.

Preparation of Aqueous-Phase Component

Distilled water (135.3 g) and sodium hydroxide serving as a neutralizer were mixed together and stirred for 15 minutes, to thereby prepare an aqueous-phase component.

The usage amount of sodium hydroxide serving as a neutralizer was adjusted such that, in the coloring resin particles to be produced, the degree of neutralization became 90%.

The specific amount of sodium hydroxide was determined by the following calculation formula.

Amount of sodium hydroxide (g)=Total amount of oil-phase component (g)×(Solid content concentration of oil-phase component (mass %)/100)× (Polyurethane content relative to solid content amount of oil-phase component (mass %)/100)× Acid value of polyurethane (mmol/g)×0.9×Molecular weight of sodium hydroxide (g/mol)/1000

Preparation of Dispersion Liquid

The oil-phase component and the aqueous-phase component were mixed together, and the resultant mixture was emulsified at room temperature using a homogenizer at 18000 rpm for 10 minutes, to provide an emulsion. The obtained emulsion was added to 48.0 g of distilled water; the resultant liquid was heated to 50° C. and stirred at 50° C. for 5 hours, to thereby drive off, from the liquid, ethyl acetate and isopropyl alcohol.

The liquid from which ethyl acetate and isopropyl alcohol had been driven off was diluted with distilled water such that the solid content concentration became 20 mass %, to thereby provide a dispersion liquid of coloring resin particles.

Preparation of Ink Composition

The dispersion liquid (35.0 g) of coloring resin particles (solid content concentration: 20 mass %), 30.0 g of tetraethylene glycol, and 1.0 g of a surfactant (product name: "OLFINE E1010", manufactured by Nissin Chemical Industry Co., Ltd.) were mixed together, and ion-exchanged water was added such that the total amount became 100 g. The mixture was filtered through a 5.0 μm filter, to thereby provide an ink composition.

Example 2 to Example 28 and Comparative
Example 1 to Comparative Example 6

Pretreatment liquids and ink compositions were prepared as in Example 1 except that the ammonium cation, the solvent, and the surfactant used for preparing the pretreatment liquid in Example 1 were changed to the types and the contents described in Table 3-1 to Table 6, and the water-insoluble dye, the dispersing agent, the solvent, and the surfactant used for preparing the ink composition in Example 1 were changed to the types and the contents described in Table 3-1 to Table 6. In Tables, for the ammonium cation, the type, molecular weight, the total number of carbon atoms, four substituents bonded to the nitrogen atom, and content are described. The type of the ammonium cation is the type of the quaternary ammonium salt used as the raw material. For Comparative Example 3 and Comparative Example 4, quaternary ammonium cations were not contained, but the types of amine salts used as the raw materials are described. For the cases where the raw materials are polymers, the specific structures of the polymers will be described later. In Tables, for components not contained, "-" are described.

Hereinafter, the ammonium cations and the surfactants used for preparation of the pretreatment liquids of Examples and Comparative Examples and described in Table 3-1 to Table 6 will be described. Note that, in the cases of preparing pretreatment liquids so as to contain quaternary ammonium cations, quaternary ammonium salts were used as raw materials and the raw materials will be described in detail.

Quaternary Ammonium Cations

QBA-1211-S . . . aqueous solution of benzyldimethyldodecylammonium chloride, manufactured by TAKEMOTO OIL & FAT Co., Ltd., solid content concentration: 50%

QBA-811 . . . aqueous solution of benzyldimethyloctylammonium chloride, manufactured by TAKEMOTO OIL & FAT Co., Ltd., solid content concentration: 50%)

QBA-444 . . . aqueous solution of benzyltributylammonium chloride, manufactured by TAKEMOTO OIL & FAT Co., Ltd., solid content concentration: 50%)

ADEKA COL CC-36: aqueous solution of polyoxypropylenemethyldiethylammonium chloride, manufactured by ADEKA CORPORATION, effective component concentration: 100 mass %

In the Table, in Substituents, "POP" means a polyoxypropylene group in which the average repeat number of oxypropylene groups is 25.

ADEKA COL CC-42: aqueous solution of polyoxypropylenemethyldiethylammonium chloride, manufactured by ADEKA CORPORATION, effective component concentration: 100 mass %

In the Table, in Substituents, "POP" means a polyoxypropylene group in which the average repeat number of oxypropylene groups is 40.

Compound 1: N-(2-acryloyloxyethyl)-N-benzyl-N,N-dimethylammonium chloride

Compound 1 is represented by the following structural formula.

$$CH_2=CH-\overset{O}{\underset{}{C}}-OCH_2CH_2-\overset{CH_3}{\underset{CH_3}{\overset{|}{N^+}}}-CH_2-\text{Ph} \quad Cl^-$$

Compound 2: didecyldimethylammonium chloride
Compound 3: trimethylphenylammonium chloride
Catiomaster PDT-7: aqueous solution of poly-2-hydroxypropyldimethylammonium chloride, manufactured by Yokkaichi Chemical Company Limited, solid content concentration: 50 mass %

Catiomaster PDT-7 is represented by the following structural formula.

$$\left[-\overset{CH_3}{\underset{CH_3}{\overset{|}{N^+}}}-CH_2CHCH_3\atop{|\atop OH}\right]_n Cl^-$$

PAS-A-5: aqueous solution of diallyldimethylammonium chloride-sulfur dioxide copolymer, manufactured by NITTOBO MEDICAL CO., LTD., solid content concentration: 25 mass %

The diallyldimethylammonium chloride-sulfur dioxide copolymer is represented by the following structural formula.

PAS-2201CL: aqueous solution of methyldiallylamine hydrochloric acid salt-sulfur dioxide copolymer, manufactured by NITTOBO MEDICAL CO., LTD., solid content concentration: 25 mass %

The methyldiallylamine hydrochloric acid salt-sulfur dioxide copolymer is represented by the following structural formula.

PAA-HCL-01: aqueous solution of allylamine hydrochloric acid salt polymer, manufactured by NITTOBO MEDICAL CO., LTD., solid content concentration: 33 mass %

The allylamine hydrochloric acid salt polymer is represented by the following structural formula.

Surfactants
OLFINE E1010: acetylene glycol-based surfactant, manufactured by Nissin Chemical Industry Co., Ltd.
Surfynol 440: acetylene glycol-based surfactant, manufactured by Nissin Chemical Industry Co., Ltd.
Capstone FS-3100: fluorosurfactant, manufactured by E. I. du Pont de Nemours and Company Hereinafter, the water-insoluble dyes and the dispersing agents used for preparing the ink compositions in Examples and Comparative Examples and described in Table 3-1 to Table 6 will be described.

Water-Insoluble Dyes
SB-3: C.I. Solvent Black 3 (product name: "Oil Black 860", manufactured by ORIENT CHEMICAL INDUSTRIES CO., LTD.
SB-27: C.I. Solvent Black 27 (product name: "Orasol (registered trademark) Black X51", manufactured by BASF)
SB-28: C.I. Solvent Black 28 (product name: "Orasol (registered trademark) Black X45", manufactured by BASF)
SB-29: C.I. Solvent Black 29 (product name: "Orasol (registered trademark) Black X55", manufactured by BASF)

For "d-1" to "d-10", synthesis was performed by subjecting C.I. Reactive Black 5 or C.I. Acid Black 1 below to an oil-soluble treatment. Specific structures of "d-1" to "d-10" will be described in Table 1 and Table 2. The synthesis methods for "d-1" to "d-10" will be described below.

C.I. Reactive Black 5

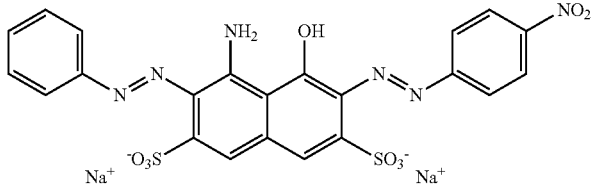

C.I. Acid Black 1

Synthesis of d-6

In a 300 mL three-neck recovery flask, 20 g of C.I. Reactive Black 5 (manufactured by Aldrich) and 11.84 g of water were stirred at 30° C. for 1 hour. After the stirring, 5.1 g of t-octylamine (manufactured by FUJIFILM Wako Pure Chemical Corporation), 31.17 g of ethyl acetate, 10.39 g of methyl ethyl ketone, and 5.71 g of sodium carbonate were added and stirring was performed at 60° C. for 2 hours. Furthermore, 53.4 g of water was added, cooling to 30° C. was performed, and subsequently stirring was performed for 2 hours. The resultant precipitate was collected by filtration and dried to thereby obtain d-6. The structure was identified by $^1$H-NMR (DMSO). For d-6, the NMR data is as follows.

NMR data of d-6

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 1.29 (s, 4H), 1.12 (s, 12H), 0.93 (s, 18H)

Synthesis of d-2 to d-5 and d-7 to d-9

The same method as in the synthesis of d-6 was performed to obtain d-2 to d-5 and d-7 to d-9 respectively except that t-octylamine was changed to the same number of moles of 2-ethylhexanol, the same number of moles of 1-dodecylthiol, the same number of moles of 3-(2-ethylhexyloxy)propylamine, the same number of moles of isobutylamine, the same number of moles of dibutylamine, the same number of moles of dihexylamine, or the same number of moles of dioctylamine.

These structures were identified also by $^1$H-NMR (DMSO).

NMR Data of d-2

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 1.57-1.50 (m, 6H), 1.31-1.12 (m, 16H), 0.89-0.75 (m, 12H)

NMR Data of d-3

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.15-3.44 (m, 8H), 2.81-2.72 (q, 4H), 2.41 (t, 4H), 1.58-1.41 (m, 8H), 1.29-1.25 (m, 32H), 0.90-0.76 (m, 6H)

NMR Data of d-4

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 6H), 2.81-2.72 (q, 4H), 2.50-2.41 (m, 4H), 1.57-1.50 (m, 10H), 1.31-1.12 (m, 16H), 0.89-0.75 (m, 12H)

NMR Data of d-5

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.50-2.41 (m, 4H), 1.67 (s, 2H), 0.89-0.75 (m, 12H)

NMR Data of d-7

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.25 (q, 8H), 1.29-1.12 (m, 16H), 0.89-0.81 (m, 12H)

NMR Data of d-8

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.25 (q, 8H), 1.29-1.12 (m, 32H), 0.89-0.81 (m, 12H)

NMR Data of d-9

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.25 (q, 8H), 1.29-1.12 (m, 48H), 0.89-0.81 (m, 12H)

Synthesis of d-10

The same procedures as in the synthesis of d-9 were performed to obtain d-10 except that, as the raw material, C.I. Reactive Black 5 in the form of Na salt was replaced by Reactive Black 5 in the form of K salt, and sodium carbonate was changed to the same number of moles of potassium carbonate. The structure was identified by 1H-NMR (DMSO). The NMR data is the same as that of d-9 and hence omitted.

Synthesis of d-1

To a 500 mL recovery flask, 141.9 g of a 10 mass % aqueous solution of benzyldimethyloctylammonium chloride was added, subsequently 154.1 g of a 10 mass % aqueous solution of C.I. Acid Black 1 was added dropwise over 30 minutes, and stirring was performed for 2 hours. The resultant precipitate was collected using filter cloth and dried, to obtain d-1. The structure was identified by 1H-NMR (DMSO). The NMR data of d-1 is as follows.

NMR Data of d-1

1H-NMR (400 MHz, DMSO-d6): 10.80 (s, 1H), 10.58 (s, 1H), 8.39 (d, 2H), 8.23 (d, 2H), 7.81 (q, 2H), 7.61-7.42 (m, 13H), 7.40 (s, 1H), 7.28 (t, 1H), 4.51 (s, 4H), 3.19-3.29 (m, 4H), 2.91 (s, 12H), 1.31-1.20 (m, 24H), 0.89-0.80 (t, 6H)

TABLE 1

| Dye structure (before made to be oil-soluble) | | Dye structure (after made to be oil-soluble) | Cation structure |
|---|---|---|---|
| d-1 | Acid Black 1 | [structure] | [benzyl dimethyl octyl ammonium]$_2$ |
| d-2 | Reactive Black 5 | [structure] | 2Na$^+$ |
| d-3 | Reactive Black 5 | [structure] | 2Na$^+$ |
| d-4 | Reactive Black 5 | [structure] | 2Na$^+$ |
| d-5 | Reactive Black 5 | [structure] | 2Na$^+$ |
| d-6 | Reactive Black 5 | [structure] | 2Na$^+$ |
| d-7 | Reactive Black 5 | [structure] | 2Na$^+$ |
| d-8 | Reactive Black 5 | [structure] | 2Na$^+$ |

TABLE 2

| | Dye structure (before made to be oil-soluble) | Dye structure (after made to be oil-soluble) | Cation structure |
|---|---|---|---|
| d-9 | Reactive Black 5 | [Chemical structure: bis-azo naphthalene dye with NH₂, OH, two SO₃⁻ groups, and two terminal −SO₂−CH₂CH₂−N(C₈H₁₇)₂ substituted phenyl groups] | 2Na⁺ |
| d-10 | Reactive Black 5 | [Chemical structure: bis-azo naphthalene dye with NH₂, OH, two SO₃⁻ groups, and two terminal −SO₂−CH₂CH₂−N(C₈H₁₇)₂ substituted phenyl groups] | 2K⁺ |

Dispersing Agent
  Polyurethane . . . polyurethane prepared by the method described in Example 1
  Styrene-acrylic . . . styrene-acrylic acid copolymer (product name: "JONCRYL 678", manufactured by BASF)

Ink Jet Textile Printing

The pretreatment liquids prepared in Examples and Comparative Examples were used to pretreat textiles. The ink compositions prepared in Examples and Comparative Examples were applied to the pretreated textiles, and heat-treated to thereby obtain printed textiles. This will be described in detail as follows.

Pretreatment of Textiles

As the textiles, strips (15 cm×4 cm) of 100% cotton cloth (product name: "Cotton D5005", manufactured by Akahori Sangyo) were prepared.

The pretreatment liquids prepared in Examples and Comparative Examples were caused, by a padding process, to permeate the textiles, and the textiles were then squeezed at a pick up of 70% and dried for 24 hours. Note that the term "pick up (%)" refers to, in such a squeezed textile including the pretreatment liquid, the residual amount (mass ratio) of the pretreatment liquid to the textile.

Application of Ink Composition

As the ink jet recording apparatus, an apparatus equipped with an ink jet head (product name: "StarFire SG-1024SA", manufactured by Fujifilm Dimatix Inc.) and an ink circulation pump was prepared. As the recording medium, such a pretreated textile was fixed on the stage. The ink tank connected to the ink jet head was charged with the ink composition. The ink jet head was placed in a line such that the nozzles were arranged in a direction orthogonal to the movement direction of the stage. The ink composition was ejected under conditions of a drop volume of 60 pL, an ejection frequency of 10 kHz, and a resolution of 400 dpi×400 dpi. The ink circulation pump was operated such that the ink composition was circulated between the ink tank and the ink jet head. Over the whole surface of the recording medium, the ink composition was ejected, to record a solid image, to obtain a colored textile.

Heat Treatment (Heat-Press)

The obtained colored textile was heat-treated using a heat-press machine (desktop automatic flat press machine, model: AF-54TEN, manufactured by Asahi Garment Machinery Co., LTD.) under conditions of 160° C. and 120 seconds, to obtain a printed textile.

Evaluations

Such printed textiles were subjected to evaluations below. The evaluations were performed in the following manner. Table 3-1 to Table 6 describe the evaluation results.

Color Fastness to Washing and Laundering (Color Staining)

The printed textiles were evaluated in terms of color staining in accordance with B1S in ISO 105-006: 2010. Of the evaluation results, 5 is the highest rank corresponding to no occurrence of color staining in the printed textile.

In the evaluation results,
  "1-2" means being higher than the rank 1 and lower than the rank 2.
  "2-3" means being higher than the rank 2 and lower than the rank 3.
  "3-4" means being higher than the rank 3 and lower than the rank 4.
  "4-5" means being higher than the rank 4 and lower than the rank 5.

Color Fastness to Washing and Laundering (Fading)

The printed textiles were evaluated in terms of fading in accordance with B1S in ISO 105-006: 2010. Of the evaluation results, 5 is the highest rank corresponding to no occurrence of fading in the printed textile.

In the evaluation results,
  "1-2" means being higher than the rank 1 and lower than the rank 2.
  "2-3" means being higher than the rank 2 and lower than the rank 3.
  "3-4" means being higher than the rank 3 and lower than the rank 4.
  "4-5" means being higher than the rank 4 and lower than the rank 5.

Texture (Hardness)

On the basis of the hardness of the printed textiles, the printed textiles were evaluated in terms of texture. The evaluation method is as follows.

From such an obtained printed textile, an evaluation sample being rectangular and having a length (long side) of 150 mm and a width (short side) of 50 mm was cut out. As an evaluation jig, a stainless steel plate having a length (long side) of 200 mm, a width (short side) of 100 mm, and a thickness of 1 mm was prepared. The evaluation jig was placed to stand such that the short-side direction lay in the vertical direction and the long-side direction lay in the horizontal direction.

Subsequently, on a long side of the evaluation jig lying in the horizontal direction, the central portion of the evaluation sample in the longitudinal direction (specifically, the center line) was placed such that both sides of the evaluation sample that were divided in the longitudinal direction (both side edge portions) hung down.

In this state, in the evaluation sample, the distance in a straight line between one of the long-side edge portions and the other long-side edge portion was measured, and evaluation ranks below were used to evaluate the texture of the printed textile. In this evaluation, the softer the evaluation sample (in other words, the better the texture), the lower both sides of the evaluation sample that are divided in the longitudinal direction hang down due to their weights (in other words, the further the evaluation sample bends); this results in, in the evaluation sample, a decrease in the distance in a straight line between one of the long-side edge portions and the other long-side edge portion.

Of the following evaluation ranks, 5 is the highest rank for the texture of the printed textile. The evaluation rank 5 means that the printed textile is extremely soft and easy to bend. The rank 3-4, rank 4, rank 4-5, and rank 5 correspond to levels at which no problems are caused in practical use.

5: the distance in the straight line is less than 40 mm.
4-5: the distance in the straight line is 40 mm or more and less than 55 mm.
4: the distance in the straight line is 55 mm or more and less than 70 mm.
3-4: the distance in the straight line is 70 mm or more and less than 85 mm.
3: the distance in the straight line is 85 mm or more and less than 100 mm.
2: the distance in the straight line is 100 mm or more and less than 115 mm.
1: the distance in the straight line is 115 mm or more.

Texture (Dampness)

On the basis of the dampness of the printed textiles, the printed textiles were evaluated in terms of texture. The evaluation method is as follows.

From such an obtained printed textile, an evaluation sample being rectangular and having a length (long side) of 150 mm and a width (short side) of 50 mm was cut out. The evaluation sample was touched by hand and, on the basis of evaluation ranks below, the texture of the printed textile was evaluated. Of the evaluation ranks below, 3 is the highest rank for the texture of the printed textile. The rank 2 and the rank 3 correspond to levels at which no problems are caused in practical use.

3: completely dry texture
2: almost dry texture
1: relatively moist texture

TABLE 3-1

| | | | | Example 1 | Example 2 | Example 3 | Example 4 | Example 5 |
|---|---|---|---|---|---|---|---|---|
| Pretreatment liquid | Quaternary ammonium cation | | Type | QBA-1211-S | QBA-811 | QBA-444 | QBA-444 | ADEKA COL CC-36 |
| | | | Molecular weight | 305 | 248 | 277 | 277 | 1465 |
| | | | Total number of carbon atoms | 21 | 17 | 19 | 19 | 80 |
| | | | Substituents | Benzyl $C_{12}H_{25}$ $CH_3$ $CH_3$ | Benzyl $C_8H_{11}$ $CH_3$ $CH_3$ | Benzyl $C_4H_9$ $C_4H_9$ $C_4H_9$ | Benzyl $C_4H_9$ $C_4H_9$ $C_4H_9$ | POP $C_2H_5$ $C_2H_5$ $CH_3$ |
| | | | Content (mass %) | 10 | 10 | 15 | 5 | 15 |
| | Solvent | 2-Pyrrolidone | Content (mass %) | 25 | 25 | 25 | 25 | 16 |
| | | 2-Methyl-1,3-propanediol | Content (mass %) | — | — | — | — | 9 |
| | Surfactant | OLFINE E1010 | Content (mass %) | 1 | 1 | 1 | 1 | 1 |
| Ink composition | Water-insoluble dye | | Type | SB-3 | SB-3 | SB-3 | SB-3 | SB-3 |
| | | | Content (mass %) | 4.2 | 4.2 | 4.2 | 4.2 | 4.2 |
| | Dispersing agent | | Type | Polyurethane | Polyurethane | Polyurethane | Polyurethane | Polyurethane |
| | | | Content (mass %) | 2.8 | 2.8 | 2.8 | 2.8 | 2.8 |
| | Solvent | Tetraethylene glycol | Content (mass %) | 30 | 30 | 30 | 30 | 30 |
| | Surfactant | OLFINE E1010 | Content (mass %) | 1 | 1 | 1 | 1 | 1 |
| Evaluations | Color fastness to washing and laundering (color staining) | | | 4-5 | 4-5 | 4-5 | 3-4 | 3-4 |
| | Color fastness to washing and laundering (fading) | | | 4-5 | 4-5 | 4-5 | 4-5 | 3-4 |
| | Texture (hardness) | | | 4-5 | 4-5 | 5 | 4-5 | 5 |
| | Texture (dampness) | | | 3 | 3 | 2 | 3 | 2 |

TABLE 3-2

|  |  |  |  | Example 6 | Example 7 | Example 8 | Example 9 | Example 10 |
|---|---|---|---|---|---|---|---|---|
| Pretreatment liquid | Quaternary ammonium cation |  | Type | ADEKA COL CC-42 | Compound 1 | QBA-811 | ADEKA COL CC-42 | Compound 2 |
|  |  |  | Molecular weight | 2365 | 235 | 248 | 2365 | 327 |
|  |  |  | Total number of carbon atoms | 125 | 14 | 17 | 125 | 22 |
|  |  |  | Substituents | POP | Benzyl | Benzyl | POP | $C_{10}H_{21}$ |
|  |  |  |  | $C_2H_5$ | 2-Acryloyloxyethyl | $C_8H_{11}$ | $C_2H_5$ | $C_{10}H_{21}$ |
|  |  |  |  | $C_2H_5$ | $CH_3$ | $CH_3$ | $C_2H_5$ | $CH_3$ |
|  |  |  |  | $CH_3$ | $CH_3$ | $CH_3$ | $CH_3$ | $CH_3$ |
|  |  |  | Content (mass %) | 15 | 10 | 20 | 20 | 10 |
|  | Solvent | 2-Pyrrolidone | Content (mass %) | 16 | 16 | 16 | 16 | 16 |
|  |  | 2-Methyl-1,3-propanediol | Content (mass %) | 9 | 9 | 9 | 9 | 9 |
|  | Surfactant | OLFINE E1010 | Content (mass %) | 1 | 1 | 1 | 1 | 1 |
| Ink composition | Water-insoluble dye |  | Type | SB-3 | SB-3 | SB-3 | SB-3 | SB-28 |
|  |  |  | Content (mass %) | 4.2 | 4.2 | 4.2 | 4.2 | 6 |
|  | Dispersing agent |  | Type | Polyurethane | Polyurethane | Polyurethane | Polyurethane | Polyurethane |
|  |  |  | Content (mass %) | 2.8 | 2.8 | 2.8 | 2.8 | 4 |
|  | Solvent | Tetraethylene glycol | Content (mass %) | 30 | 30 | 30 | 30 | 30 |
|  | Surfactant | OLFINE E1010 | Content (mass %) | 1 | 1 | 1 | 1 | 1 |
| Evaluations | Color fastness to washing and laundering (color staining) |  |  | 3-4 | 4 | 3-4 | 3-4 | 3-4 |
|  | Color fastness to washing and laundering (fading) |  |  | 3-4 | 4-5 | 4-5 | 3-4 | 3-4 |
|  | Texture (hardness) |  |  | 5 | 5 | 5 | 5 | 4-5 |
|  | Texture (dampness) |  |  | 2 | 3 | 2 | 2 | 2 |

TABLE 4-1

|  |  |  |  | Example 11 | Example 12 | Example 13 | Example 14 |
|---|---|---|---|---|---|---|---|
| Pretreatment liquid | Quaternary ammonium cation |  | Type | Compound 3 | QBA-1211-S | QBA-811 | QBA-444 |
|  |  |  | Molecular weight | 136 | 305 | 248 | 277 |
|  |  |  | Total number of carbon atoms | 9 | 21 | 17 | 19 |
|  |  |  | Substituents | Phenyl | Benzyl | Benzyl | Benzyl |
|  |  |  |  | $CH_3$ | $C_{12}H_{25}$ | $C_8H_{11}$ | $C_4H_9$ |
|  |  |  |  | $CH_3$ | $CH_3$ | $CH_3$ | $C_4H_9$ |
|  |  |  |  | $CH_3$ | $CH_3$ | $CH_3$ | $C_4H_9$ |
|  |  |  | Content (mass %) | 10 | 10 | 10 | 15 |
|  | Solvent | 2-Pyrrolidone | Content (mass %) | 16 | 25 | 25 | 25 |
|  |  | 2-Methyl-1,3-propanediol | Content (mass %) | 9 | — | — | — |
|  | Surfactant | OLFINE E1010 | Content (mass %) | 1 | — | — | 1 |
|  |  | Surfynol 440 | Content (mass %) | — | 0.4 | — | — |
|  |  | Capstone FS-3100 | Content (mass %) | — | — | 0.1 | — |
| Ink composition | Water-insoluble dye |  | Type | SB-28 | SB-28 | SB-28 | SB-28 |
|  |  |  | Content (mass %) | 6 | 6 | 6 | 6 |
|  | Dispersing agent |  | Type | Polyurethane | Polyurethane | Polyurethane | Polyurethane |
|  |  |  | Content (mass %) | 4 | 4 | 4 | 4 |
|  | Solvent | Tetraethylene glycol | Content (mass %) | 30 | 30 | 30 | 30 |
|  | Surfactant | OLFINE E1010 | Content (mass %) | 1 | — | — | 1 |
|  |  | Surfynol 440 | Content (mass %) | — | 0.4 | 0.4 | — |
| Evaluations | Color fastness to washing and laundering (color staining) |  |  | 4 | 4-5 | 4-5 | 4-5 |
|  | Color fastness to washing and laundering (fading) |  |  | 4 | 4-5 | 4-5 | 4-5 |
|  | Texture (hardness) |  |  | 4-5 | 4-5 | 4-5 | 5 |
|  | Texture (dampness) |  |  | 2 | 2 | 2 | 2 |

TABLE 4-2

|  |  |  | Example 15 | Example 16 | Example 17 | Example 18 |
|---|---|---|---|---|---|---|
| Pretreatment liquid | Quaternary ammonium cation | Type | QBA-1211-S | QBA-1211-S | QBA-1211-S | Tetraethylammonium chloride |
|  |  | Molecular weight | 305 | 305 | 305 | 130 |
|  |  | Total number of carbon atoms | 21 | 21 | 21 | 8 |

TABLE 4-2-continued

|  |  |  |  | Example 15 | Example 16 | Example 17 | Example 18 |
|---|---|---|---|---|---|---|---|
|  |  |  | Substituents | Benzyl $C_{12}H_{25}$ $CH_3$ $CH_3$ | Benzyl $C_{12}H_{25}$ $CH_3$ $CH_3$ | Benzyl $C_{12}H_{25}$ $CH_3$ $CH_3$ | $C_2H_5$ $C_2H_5$ $C_2H_5$ $C_2H_5$ |
|  |  |  | Content (mass %) | 10 | 10 | 10 | 10 |
|  | Solvent | 2-Pyrrolidone | Content (mass %) | 25 | 25 | 25 | 25 |
|  |  | 2-Methyl-1,3-propanediol | Content (mass %) | — | — | — | — |
|  | Surfactant | OLFINE E1010 | Content (mass %) | 1 | — | — | 1 |
|  |  | Surfynol 440 | Content (mass %) | — | — | — | — |
|  |  | Capstone FS-3100 | Content (mass %) | — | — | — | — |
| Ink composition | Water-insoluble dye |  | Type | SB-29 | SB-27 | SB-3 | SB-3 |
|  |  |  | Content (mass %) | 6 | 6 | 4.2 | 4.2 |
|  | Dispersing agent |  | Type | Polyurethane | Polyurethane | Styreneacrylic | Polyurethane |
|  |  |  | Content (mass %) | 4 | 4 | 2.8 | 2.8 |
|  | Solvent | Tetraethylene glycol | Content (mass %) | 30 | 30 | 30 | 30 |
|  | Surfactant | OLFINE E1010 | Content (mass %) | 1 | — | — | 1 |
|  |  | Surfynol 440 | Content (mass %) | — | — | — | — |
| Evaluations | Color fastness to washing and laundering (color staining) |  |  | 4 | 4 | 3-4 | 3-4 |
|  | Color fastness to washing and laundering (fading) |  |  | 4-5 | 4-5 | 4-5 | 3-4 |
|  | Texture (hardness) |  |  | 4 | 4 | 3-4 | 3-4 |
|  | Texture (dampness) |  |  | 2 | 2 | 2 | 3 |

TABLE 5-1

|  |  |  |  | Example 19 | Example 20 | Example 21 | Example 22 | Example 23 |
|---|---|---|---|---|---|---|---|---|
| Pretreatment liquid | Quaternary ammonium cation |  | Type | QBA-1211-S | QBA-1211-S | QBA-1211-S | QBA-1211-S | QBA-1211-S |
|  |  |  | Molecular weight | 305 | 305 | 305 | 305 | 305 |
|  |  |  | Total number of carbon atoms | 21 | 21 | 21 | 21 | 21 |
|  |  |  | Substituents | Benzyl $C_{12}H_{25}$ $CH_3$ $CH_3$ | Benzyl $C_{12}H_{25}$ $CH_3$ $CH_3$ | Benzyl $C_{12}H_{25}$ $CH_3$ $CH_3$ | Benzyl $C_{12}H_{25}$ $CH_3$ $CH_3$ | Benzyl $C_{12}H_{25}$ $CH_3$ $CH_3$ |
|  |  |  | Content (mass %) | 10 | 10 | 10 | 10 | 10 |
|  | Solvent | 2-Pyrrolidone | Content (mass %) | 25 | 25 | 25 | 25 | 25 |
|  | Surfactant | OLFINE E1010 | Content (mass %) | 1 | 1 | 1 | 1 | 1 |
| Ink composition | Water-insoluble dye |  | Type | d-1 | d-2 | d-3 | d-4 | d-5 |
|  |  |  | Content (mass %) | 4.2 | 4.2 | 4.2 | 4.2 | 4.2 |
|  | Dispersing agent |  | Type | Polyurethane | Polyurethane | Polyurethane | Polyurethane | Polyurethane |
|  |  |  | Content (mass %) | 2.8 | 2.8 | 2.8 | 2.8 | 4 |
|  | Solvent | Tetraethylene glycol | Content (mass %) | 30 | 30 | 30 | 30 | 30 |
|  | Surfactant | OLFINE E1010 | Content (mass %) | 1 | 1 | 1 | 1 | 1 |
| Evaluations | Color fastness to washing and laundering (color staining) |  |  | 4 | 4 | 4 | 4-5 | 4-5 |
|  | Color fastness to washing and laundering (fading) |  |  | 4-5 | 4-5 | 4-5 | 5 | 5 |
|  | Texture (hardness) |  |  | 4 | 4 | 4 | 4-5 | 4-5 |
|  | Texture (dampness) |  |  | 2 | 2 | 2 | 2 | 2 |

TABLE 5-2

|  |  |  | Example 19 | Example 20 | Example 21 | Example 22 | Example 23 |
|---|---|---|---|---|---|---|---|
| Pretreatment liquid | Quaternary ammonium cation | Type | QBA-1211-S | QBA-1211-S | QBA-1211-S | QBA-1211-S | QBA-1211-S |
|  |  | Molecular weight | 305 | 305 | 305 | 305 | 305 |
|  |  | Total number of carbon atoms | 21 | 21 | 21 | 21 | 21 |
|  |  | Substituents | Benzyl $C_{12}H_{25}$ $CH_3$ $CH_3$ | Benzyl $C_{12}H_{25}$ $CH_3$ $CH_3$ | Benzyl $C_{12}H_{25}$ $CH_3$ $CH_3$ | Benzyl $C_{12}H_{25}$ $CH_3$ $CH_3$ | Benzyl $C_{12}H_{25}$ $CH_3$ $CH_3$ |
|  |  | Content (mass %) | 10 | 10 | 10 | 10 | 10 |

TABLE 5-2-continued

|  |  |  |  | Example 19 | Example 20 | Example 21 | Example 22 | Example 23 |
|---|---|---|---|---|---|---|---|---|
| Ink composition | Solvent | 2-Pyrrolidone | Content (mass %) | 25 | 25 | 25 | 25 | 25 |
|  | Surfactant | OLFINE E1010 | Content (mass %) | 1 | 1 | 1 | 1 | 1 |
|  | Water-insoluble dye |  | Type | d-6 | d-7 | d-8 | d-9 | d-10 |
|  |  |  | Content (mass %) | 4.2 | 4.2 | 4.2 | 4.2 | 4.2 |
|  | Dispersing agent |  | Type | Polyurethane | Polyurethane | Polyurethane | Polyurethane | Polyurethane |
|  |  |  | Content (mass %) | 2.8 | 2.8 | 2.8 | 2.8 | 2.8 |
|  | Solvent | Tetraethylene glycol | Content (mass %) | 30 | 30 | 30 | 30 | 30 |
|  | Surfactant | OLFINE E1010 | Content (mass %) | 1 | 1 | 1 | 1 | 1 |
| Evaluations | Color fastness to washing and laundering (color staining) |  |  | 4-5 | 4-5 | 4-5 | 4-5 | 4-5 |
|  | Color fastness to washing and laundering (fading) |  |  | 5 | 5 | 5 | 5 | 5 |
|  | Texture (hardness) |  |  | 4-5 | 4-5 | 4-5 | 4-5 | 4-5 |
|  | Texture (dampness) |  |  | 2 | 2 | 2 | 2 | 2 |

TABLE 6

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Pretreatment liquid | Quaternary ammonium cation | Type | QBA-1211-S | QBA-1211-S | Catiomaster PDT-7 | PAS-A-5 | PAS-2201CL | PAA-HCL-01 |
|  |  | Molecular weight | 305 | 305 | 3700 | 3400 | — | — |
|  |  | Total number of carbon atoms | 21 | 21 |  |  |  |  |
|  |  | Substituents | Benzyl $C_{12}H_{25}$ $CH_3$ $CH_3$ | Benzyl $C_{12}H_{25}$ $CH_3$ $CH_3$ | Refer to structure | Refer to structure | Refer to structure | Refer to structure |
|  |  | Content (mass %) | 1 | 23 | 10 | 10 | 10 | 10 |
|  | Solvent | 2-Pyrrolidone Content (mass %) | 25 | 25 | 25 | 25 | 16 | 16 |
|  |  | 2-Methyl-1,3-propanediol Content (mass %) | — | — | — | — | 9 | 9 |
| Ink composition | Water-insoluble dye | Type | SB-3 | SB-3 | SB-28 | SB-28 | SB-3 | SB-3 |
|  |  | Content (mass %) | 4.2 | 4.2 | 6 | 6 | 4.2 | 4.2 |
|  | Dispersing agent | Type | Polyurethane | Polyurethane | Polyurethane | Polyurethane | Polyurethane | Polyurethane |
|  |  | Content (mass %) | 2.8 | 2.8 | 4 | 4 | 2.8 | 2.8 |
|  | Solvent | Tetraethylene glycol Content (mass %) | 30 | 30 | 30 | 30 | 30 | 30 |
| Evaluations | Color fastness to washing and laundering (color staining) |  | 1 | 4-5 | 3 | 2 | 1 | 1 |
|  | Color fastness to washing and laundering (fading) |  | 1 | 4 | 3 | 3 | 2 | 1 |
|  | Texture (hardness) |  | 4 | 4-5 | 3 | 2 | 3-4 | 3-4 |
|  | Texture (dampness) |  | 3 | 1 | 2 | 2 | 2 | 2 |

As described in Table 3-1 to Table 6, it has been demonstrated that Example 1 to Example 28, in which the pretreatment liquids include a quaternary ammonium cation having a molecular weight of 3000 or less, the ink compositions include a water-insoluble dye, a dispersing agent, and water, and the content of the quaternary ammonium cation relative to the total amount of the pretreatment liquid is 5 mass % to 20 mass %, provide printed textiles that are less likely to cause color staining of other textiles and have good texture. Note that it has been demonstrated that, when the pretreatment liquid of Example 1 is charged into, in the ink jet recording apparatus for the ink composition, another ink tank, and ejected, and subsequently the ink composition of Example 1 is ejected, to obtain a printed textile in the same method as in Example 1, it has better texture (hardness).

Comparison among Example 10, Example 11, and Example 14 has revealed the following: Example 11 and Example 14, in which the pretreatment liquids include a quaternary ammonium salt having an aromatic ring, achieve further suppression of color staining of other textiles; Example 14, in which the pretreatment liquid includes a quaternary ammonium salt having a benzyl group, achieves even further suppression of color staining of other textiles.

It has been demonstrated that Example 1, in which the total number of carbon atoms of the quaternary ammonium cation is 10 or more, compared with Example 18, achieves suppression of color staining of other textiles, and provides good texture.

On the other hand, it has been demonstrated that Comparative Example 1, in which the content of the quaternary ammonium cation relative to the total amount of the pretreatment liquid is as low as 1 mass %, exhibits poor color fastness to washing and laundering (color staining).

It has been demonstrated that Comparative Example 2, in which the content of the quaternary ammonium cation relative to the total amount of the pretreatment liquid is as high as 23 mass %, exhibits poor texture (dampness).

It has been demonstrated that Comparative Example 3 and Comparative Example 4, in which the quaternary ammonium cation has a molecular weight of more than 3000, exhibits poor color fastness to washing and laundering and poor texture.

It has been demonstrated that Comparative Example 5 and Comparative Example 6, in which the pretreatment liquid does not include a quaternary ammonium cation, exhibit poor color fastness to washing and laundering.

As has been described so far, the ink set according to an embodiment of the present disclosure has a pretreatment liquid including a quaternary ammonium cation having a molecular weight of 3000 or less and an ink composition including a water-insoluble dye, a dispersing agent, and water, wherein the content of the quaternary ammonium cation relative to the total amount of the pretreatment liquid is 5 mass % to 20 mass %, and the ink set provides a printed textile that is less likely to cause color staining of other textiles and has good texture.

Note that the entire contents disclosed by JP2019-180627 filed in the Japan Patent Office on Sep. 30, 2019 are incorporated herein by reference. All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. A textile printing ink set comprising:
   a pretreatment liquid comprising a quaternary ammonium cation having a molecular weight of 3000 or less; and
   an ink composition comprising a water-insoluble dye, a water-soluble dispersing agent, and water,
   wherein the water-soluble dispersing agent is a urethane resin which disperses the water-insoluble dye in the water,
   wherein a content of the water-insoluble dye relative to a total amount of the ink composition is 1 mass % to 10 mass %,
   wherein a content of the quaternary ammonium cation relative to a total amount of the pretreatment liquid is 5 mass % to 20 mass %,
   wherein the quaternary ammonium cation has an aromatic ring, which is a benzene ring, naphthalene ring, or anthracene ring, and
   wherein upon contact of the ink composition with the quaternary ammonium cation, the quaternary ammonium cation turns the water-soluble dispersing agent to become insoluble in the water, causing aggregation of the water-insoluble dye.

2. The textile printing ink set according to claim 1, wherein the quaternary ammonium cation has a total number of carbon atoms of 10 or more.

3. The textile printing ink set according to claim 1, wherein the quaternary ammonium cation has a benzyl group.

4. The textile printing ink set according to claim 1, wherein the water-insoluble dye is at least one dye selected from the group consisting of an oil-soluble dye, a disperse dye, and a vat dye.

5. A textile printing method comprising:
   applying the pretreatment liquid comprised in the textile printing ink set according to claim 1, to a textile; and
   applying the ink composition comprised in the textile printing ink set according to claim 1, to the textile to which the pretreatment liquid has been applied.

6. The textile printing method according to claim 5, wherein, in the applying of the pretreatment liquid, the pretreatment liquid is applied by an ink jet recording process.

7. The textile printing method according to claim 5, wherein, in the applying of the ink composition, the ink composition is applied by an ink jet recording process.

* * * * *